United States Patent
Takahata et al.

(10) Patent No.: US 9,792,784 B2
(45) Date of Patent: Oct. 17, 2017

(54) SHOPPING SUPPORT SERVER AND PROGRAM

(71) Applicant: TOSHIBA TEC KABUSHIKI KAISHA, Tokyo (JP)

(72) Inventors: Masami Takahata, Tokyo (JP); Naoki Watanabe, Tokyo (JP); Tomonori Ikumi, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/230,158

(22) Filed: Aug. 5, 2016

(65) Prior Publication Data

US 2017/0069177 A1    Mar. 9, 2017

(30) Foreign Application Priority Data

Sep. 3, 2015    (JP) .................................. 2015-173952

(51) Int. Cl.
| | |
|---|---|
| *G06K 15/00* | (2006.01) |
| *G07G 1/00* | (2006.01) |
| *G06Q 30/06* | (2012.01) |
| *G06Q 30/02* | (2012.01) |
| *G06K 7/14* | (2006.01) |
| *G07G 5/00* | (2006.01) |

(52) U.S. Cl.
CPC ......... *G07G 1/0072* (2013.01); *G06K 7/1413* (2013.01); *G06Q 30/0207* (2013.01); *G06Q 30/0238* (2013.01); *G06Q 30/06* (2013.01); *G06Q 30/0631* (2013.01); *G06Q 30/0633* (2013.01); *G07G 5/00* (2013.01)

(58) Field of Classification Search
CPC ...... G06Q 30/06; G06Q 20/20; G06Q 10/087; G06Q 10/08
USPC .................................................. 235/383, 385
See application file for complete search history.

(56) References Cited

U.S. PATENT DOCUMENTS

2015/0324882 A1*  11/2015  Ouimet ............. G06Q 30/0633
                                                705/26.41

FOREIGN PATENT DOCUMENTS

JP          2007-058704          3/2007

* cited by examiner

*Primary Examiner* — Karl D Frech
(74) *Attorney, Agent, or Firm* — Patterson & Sheridan, LLP

(57) ABSTRACT

According to one embodiment, a shopping support server includes a merchandise list unit that lists merchandise a shopper plans to purchase; a merchandise evaluation unit that identifies merchandise listed by the merchandise list unit upon which the shopper has performed a health evaluation; a calculation unit that calculates a ratio between the merchandise listed by the merchandise list unit and merchandise identified by the merchandise evaluation unit; and a notification unit that notifies the shopper of the ratio.

15 Claims, 17 Drawing Sheets

| MERCHANDISE ID | MERCHANDISE TYPE ID | MERCHANDISE NAME | UNIT PRICE | WEIGHT |

| MERCHANDISE ID | NUTRIENT ID | AMOUNT | NUTRIENT ID | AMOUNT |

| NUTRIENT ID | AMOUNT |

| MERCHANDISE ID | MEMBER·SEX·AGE OR THE LIKE |

| EVALUATION CATEGORY | ITEM NUMBER n | ITEM ID 1 TO n |

SHOPPING SUPPORT SERVER AND PROGRAM

CROSS-REFERENCE TO RELATED APPLICATION

This application is based upon and claims the benefit of priority from Japanese Patent Application No. 2015-173952, filed on Sep. 3, 2015, the entire contents of which are incorporated herein by reference.

FIELD

Embodiments described herein relate generally to a server of a shopping support system and a program which runs on the server.

BACKGROUND

Most food items available for purchase in supermarkets display nutrition components included in the food. Shoppers are increasingly using the nutrition information on food items to determine their food purchases. Conventional shopping systems include shopping carts that display nutrition components of the food on a display device provided in the cart, in order to support the shopper.

Shoppers know that the nutrition balance of the entire meal, rather than nutrition component of each food, is important. A desirable meal, for example, is based on a staple food, a main dish, and a side dish. For this reason, shoppers prefer to purchase food based on the nutrition balance of the entire meal combining the main dish and the side dish. Conventional shopping systems can also check nutrition balance based on a shopper's purchase history. What is needed is a system that allows a shopper to check nutrition balance based on food to be purchased.

DESCRIPTION OF THE DRAWINGS

FIG. 2 is a schematic diagram illustrating a data structure of a merchandise information record.

FIG. 3 is a schematic diagram illustrating a data structure of a nutrition information record.

FIG. 4 is a schematic diagram illustrating a data structure of a member information record.

DETAILED DESCRIPTION

Described herein is a server of a shopping support system which supports a shopper to be able to do healthy shopping by checking a nutrition balance of food to be purchased.

In general, according to one embodiment, A shopping support server includes a merchandise list unit that lists merchandise a shopper plans to purchase; a merchandise evaluation unit that identifies merchandise listed by the merchandise list unit upon which the shopper has performed a cart evaluation; a calculation unit that calculates a ratio between the merchandise listed by the merchandise list unit merchandise identified by the merchandise evaluation unit; and a notification unit that notifies the shopper of the ratio.

Hereinafter, embodiments of a shopping support system will be described with reference to the accompanying drawings.

The embodiments provide a system which supports a shopper so as to do healthy shopping in an existing store, such as a supermarket.

First Embodiment

Figure 1:
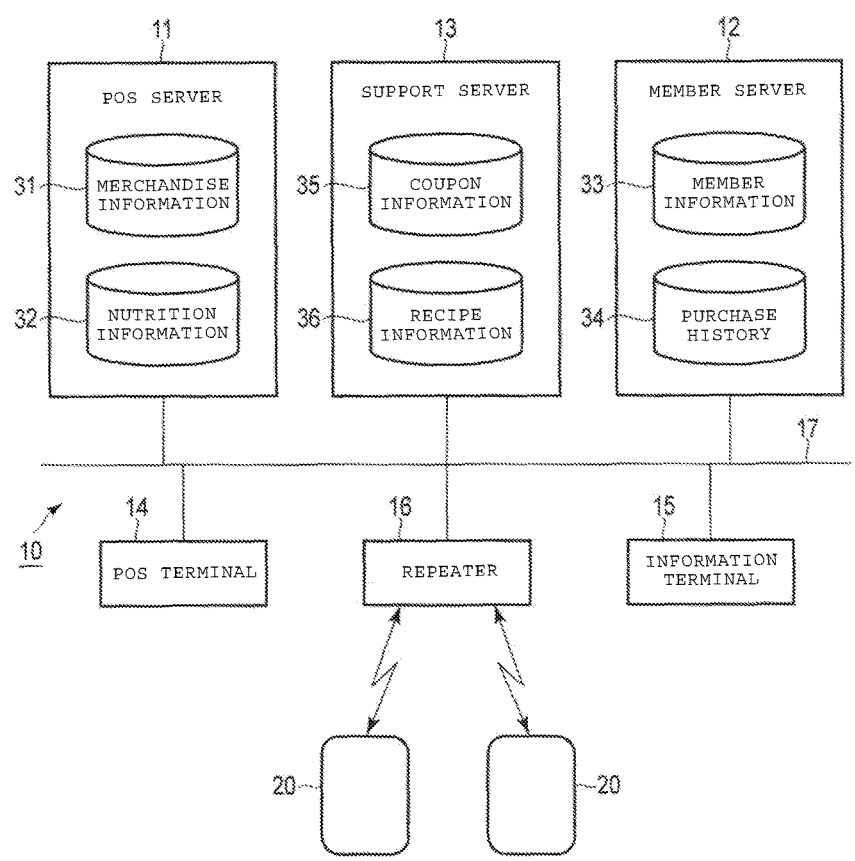
FIG. 1 is a block diagram schematically illustrating the entire configuration of a shopping support system according to one embodiment.

FIG. 1 is a block diagram schematically illustrating the entire configuration of a shopping support system 10 according to the present embodiment. The shopping support system 10 includes a point of sales (POS) server 11, a member server 12, a shopping support server (hereinafter, referred to as a support server) 13, a POS terminal 14, an information terminal 15, a repeater 16, and a network 17 such as a local area network (LAN). In addition, each of the servers 11, 12, and 13 is connected to the POS terminal 14, the information terminal 15, and the repeater 16 through the network 17. The network 17 may be, for example, a wired LAN, or a wireless LAN. The repeater 16 performs wireless data communication with a user terminal 20 which is operated by a shopper.

The shopping support system 10 is typically deployed in a supermarket or other food store. The shopper registers merchandise the shopper plans to purchase using the user terminal 20. As the shopper registers merchandise, the shopping support system 10 evaluates whether the shopper has selected merchandise with excellent nutrition balance, and supports the shopper to make healthy choices. In addition, shopping support system 10 can simplify operation of the POS terminal 14.

The respective servers 11, 12, and 13 are arranged in, for example, an office of a store. Placement of the servers is not particularly limited, so long as the servers 11, 12, and 13 can communicate with the POS terminal 14, the information terminal 15, and the repeater 16. The servers 11, 12, and 13 may also be arranged in an arbitrary place other than the store. The respective servers 11, 12, and 13 may be installed as, for example, cloud computing on Internet.

The POS terminal 14 is installed in, for example, a payment machine (cash register) of a store. The POS terminal 14 registers data of merchandise (purchased merchandise) which is purchased by a shopper. Price of the purchased merchandise is calculated by the POS terminal 14. In addition, the POS terminal 14 performs payment processing for the purchased merchandise. The payment processing includes processing cash payment and credit payment. Since registration processing and payment processing are known, detailed description thereof will be omitted.

The POS terminal 14 may be operated by a store assistant called a cashier or by the shopper for himself. In addition, a registration unit which performs registration processing and a payment unit which performs payment processing may be provided separately, and a semi-self system may be used in which a store assistant operates the registration unit and a shopper operates the payment unit.

The information terminal 15 is arranged near, for example, a sales floor or a doorway in the store. The information terminal 15 includes a touch panel and the shopper uses the information terminal so as to obtain service information. The information terminal 15 may include a scanner for reading a barcode and/or a printer. Alternatively, a printer may be an external apparatus having a printing function.

The repeater 16 is arranged in, for example, a sales floor of a store. The repeater 16 provides a wireless communication network between the user terminals 20 operated by shoppers on the sales floor. In addition, the repeater 16 receives a wireless data signal from the user terminal 20, and transmits the wireless data signal to any one of the servers 11, 12, and 13 through the network 17. In addition, the repeater 16 converts a data signal addressed to a user terminal 20 received from any one of the servers 11, 12, and 13 into a wireless data signal, and transmits the wireless data signal to the destination user terminal 20.

The user terminal 20 is a computer having a wireless communication function. The user terminal 20 is used by a shopper while shopping in a store. For example, a smart phone, a tablet terminal, a mobile phone, or the like can be used as the user terminal 20.

In FIG. 1, the POS terminal 14, each of the information terminal 15, and the repeater 16 is illustrated as a single item, but is not necessarily a single item. Typically, the shopping support system 10 is configured by connecting two or more POS terminals 14, two or more information terminals 15, and two or more repeaters 16 to the network 17. In addition, FIG. 1 does not illustrate multiple user terminals 20 in communication with the repeater 16. However, a user terminal is operated by each shopper, so the repeater 16 can simultaneously relay wireless data signals between multiple user terminals 20.

The POS server 11 includes a merchandise information database 31 and a nutrition information database 32.

The merchandise information database 31 stores a merchandise information record 31R which is generated for each merchandise. Merchandise is not limited to food. The merchandise information record 31R of merchandise other than food can be stored in the merchandise information database 31. The POS server 11 accesses the merchandise information record 31R in the merchandise information database 31.

The merchandise information record 31R includes a merchandise ID, a merchandise type ID, a merchandise name, a unit price, weight, and the like, as illustrated in FIG. 2. The merchandise ID is a unique code assigned to each merchandise so as to identify each merchandise individually. The merchandise type ID is a unique code assigned to each merchandise type so as to independently identify merchandise types. The types include "cereals", "beans", "meat", "seafood", "seaweed", "vegetables", "fruits", "mushrooms", "dairy products", and the like for food. The merchandise name is a name of merchandise which is identified by a corresponding merchandise ID. The unit price is a price per merchandise, and the weight is an average weight per merchandise.

The nutrition information database 32 stores a nutrition information record 32R for each merchandise with a food type. The POS server 11 accesses the nutrition information record 32R in the nutrition information database 32.

The nutrition information record 32R includes the merchandise ID and a plurality of nutrient IDs and corresponding numerical values representing quantity of the nutrient present in the merchandise, as illustrated in FIG. 3. The nutrient ID is a unique ID assigned to each nutrient so as to independently identify various nutrients included in food. The numerical value represents quantity of the nutrient identified by the nutrient ID. Each nutrient ID and numerical value constitutes a data pair relating to the merchandise (food) identified by the corresponding merchandise ID. For example, in a food item of 30 kcal including protein of 14 g and lipid of 32 g, the nutrition information record 32R includes the calorie nutrient ID and the numerical value of 30 kcal; the protein nutrient ID and the numerical value of 14 g; and the lipid nutrient ID and the numerical value of 32 g, stored in the nutrition information database 32 in association with the merchandise ID of the food item.

The member server 12 includes a member information database 33 and a purchase history database 34.

The member information database 33 stores a member information record 33R which is generated for each member. The member server 12 accesses the member information database 33 to perform reading or writing of the member information record 33R.

The member information record 33R includes a member ID, personal data, an evaluation criterion, an item number n, an item ID corresponding to the item number n, and the like, as illustrated in FIG. 4. The member ID is a unique code assigned to each member so as to independently identify each member. The personal data includes a member name of the member, sex, age, and the like.

The evaluation criterion enables a member to select whether health evaluation of the member's shopping habits is based on food types or nutrients. In the present embodiment, the evaluation criterion is set to "1" when the evaluation is performed by using food type as a standard, and the evaluation criterion is set as "2", when the evaluation is performed by using nutrients as a standard.

The item number n is the number of food types or nutrients on which the member wishes to base healthy shopping evaluation. When the evaluation criterion is "1", that is, when the evaluation is performed by using food type as a standard, merchandise type ID's for n food types are stored in the member information record 33R. When the evaluation criterion is "2", that is, when the evaluation is performed by using nutrients as a standard, nutrient ID's for n nutrients are stored in the member information record 33R.

The member previously determines whether food type is used or nutrients are used as a standard for evaluating healthy shopping with excellent nutrition balance. When the member uses food type as the evaluation criterion, the member selects one or more merchandise type IDs to monitor for good health balance. When nutrients are used as the evaluation criterion, the member selects one or more nutrient IDs to monitor for good health balance. For example, a member who wants to monitor vegetables and mushrooms for good health balance will create a member information record 33R in which the evaluation criterion is set as "1" (food types), the item number n is set as "2" (2 food types), and the merchandise type ID of vegetables and the merchandise type ID of mushrooms are set as the item ID. For another example, a member who wants to monitor iron for good health balance will create a member information record 33R in which the evaluation criterion is set as "2" (nutrients), the item number n is set as "1" (one nutrient), and the nutrient ID of iron is set as the item ID.

In the above description, a member determines the evaluation criterion for health evaluation (either food types or nutrients), but in the absence of a designation by the member, a default evaluation criterion may be applied. Generally, intake of vegetables or fruits results in healthy nutrition balance. Hence, vegetables and fruits may be set as the default evaluation criterion (evaluation criterion "1", item number n "2", merchandise type ID's for vegetables and fruits). If the shopper wants an evaluation criterion other than the default evaluation criterion, the shopper changes the evaluation criterion, as further described below.

The purchase history database 34 stores a purchase history record 34R for each member. The member server 12 accesses the purchase history database 34 to read or write the purchase history record 34R.

Figure 5:
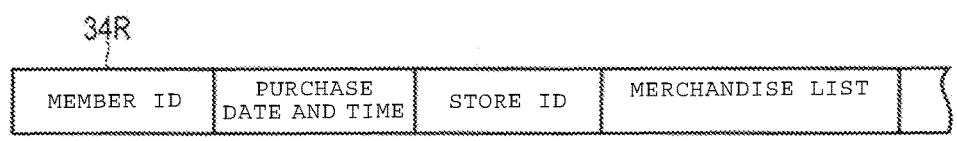
FIG. 5 is a schematic diagram illustrating a data structure of a purchase history record.

As illustrated in FIG. 5, the purchase history record 34R includes a member ID, purchase date and time, a store ID, a purchased merchandise list, and the like. The purchase data and time is a date and time when a member identified by a corresponding member ID purchased merchandise in a store. The store ID is a unique store ID specifying a store in which the member purchased merchandise. The purchased merchandise list is a list of merchandise that the member has purchased in the store specified by the store ID at the purchase date and time. The list includes a merchandise ID, a merchandise name, a unit price, an amount, a price, a total amount of money, and the like.

The support server 13 includes a coupon information database 35 and a recipe information database 36.

The coupon information database 35 stores a coupon information record 35R representing content of a coupon.

The support server 13 accesses the coupon information database 35 to read or write the coupon information record 35R.

Figure 6:
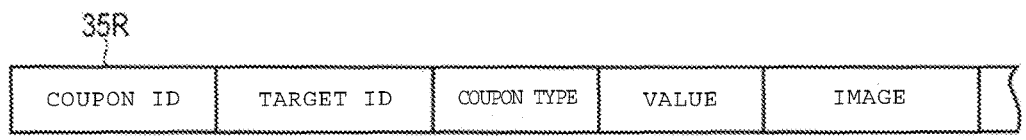
FIG. 6 is a schematic diagram illustrating a data structure of a coupon information record.

As illustrated in FIG. 6, the coupon information record 35R includes a coupon ID, a target ID, a coupon type ID, a value, an image, and the like. The coupon ID is a unique code assigned to each coupon. The target ID is an identification code of merchandise which is the subject of the coupon. When one piece of merchandise is the subject of a coupon, the target ID is the merchandise ID of the merchandise that is the subject of the coupon. When a type of merchandise is the subject of a coupon, the target ID is the merchandise type ID of the merchandise. The coupon type ID distinguishes types of coupons, such as price cut, discount, price change, or other types of coupons. In the present embodiment, the coupon type ID of a price cut coupon is set as "1", a discount coupon is set as "2", and a price change coupon is set as "3". The price cut coupon has a price cut amount, the discount coupon has a discount rate, and the price change coupon has a changed price. The image indicates an image of a coupon.

The recipe information database 36 stores a recipe information record 36R which is generated for a recipe. The support server 13 accesses the recipe information database 36 so as to read or write the recipe information record 36R.

Figure 7:
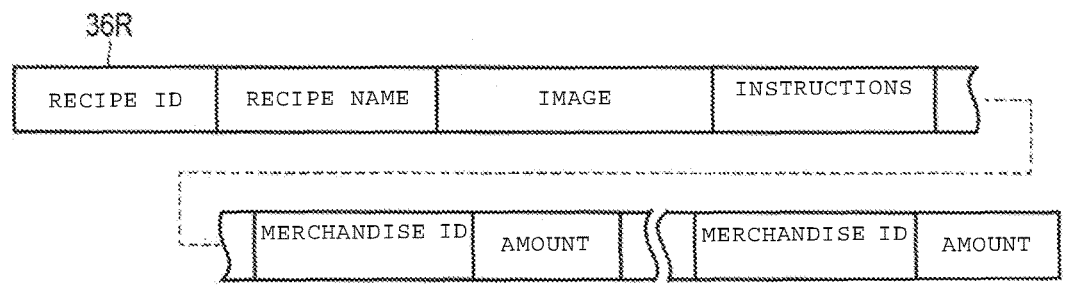
FIG. 7 is a schematic diagram illustrating a data structure of a recipe information record.

As illustrated in FIG. 7, the recipe information record 36R includes a recipe ID, a recipe name and an image, cooking sequence information, and pairs of merchandise ID's and amounts. The recipe ID is a unique code assigned to each recipe. The recipe name and the image are a name and an image of the recipe. The cooking sequence information is text data of instructions for preparing the recipe. The pair of a merchandise ID and an amount indicates a merchandise ID of a food material which is used in the recipe, and the amount used.

Figure 8:
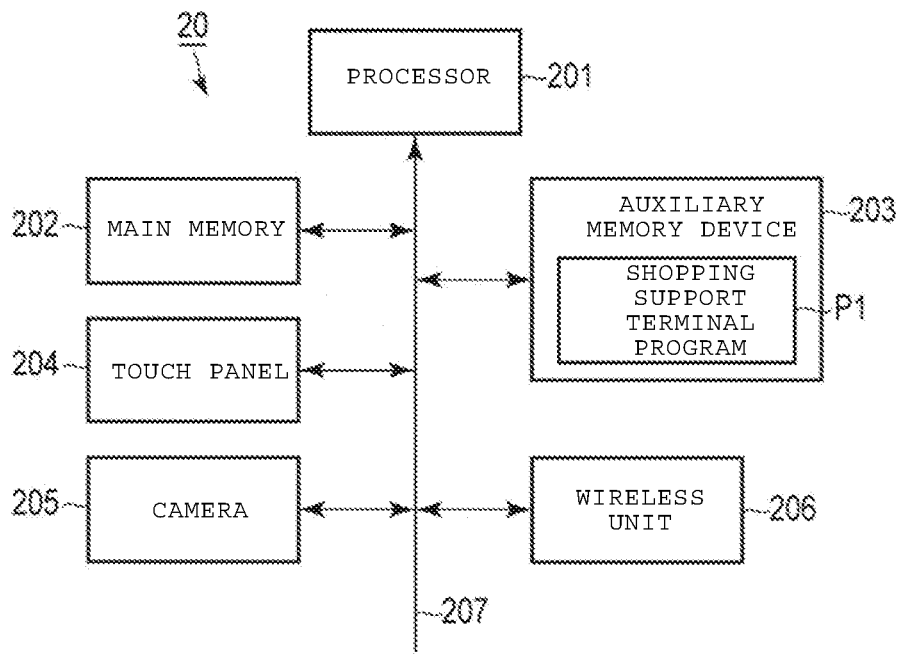
FIG. 8 is a block diagram illustrating a configuration of a user terminal of the shopping support system of FIG. 1.

FIG. 8 is a block diagram illustrating a main configuration of the user terminal 20. The user terminal 20 includes a processor 201, a main memory 202, an auxiliary memory device 203, a touch panel 204, a camera unit 205, a wireless unit 206, and the like. The processor 201, the main memory 202, the auxiliary memory device 203, the touch panel 204, the camera unit 205, and the wireless unit 206 are connected to each other through a system transmission path 207 including an address bus, a data bus, a control signal line, or the like.

The user terminal 20 constitutes a computer with the processor 201, the main memory 202, the auxiliary memory device 203, and the system transmission path 207 connecting the processor, the main memory, and the auxiliary memory device to each other.

The processor 201 is the main processor of the user terminal 20. The processor 201 controls each unit according to an operating system or an application program so as to perform various functions of the user terminal 20. The processor 201 thus functions as a controller for the user terminal 20 and all the units thereof.

The main memory 202 is a main memory unit of the user terminal 20. The main memory 202 includes a nonvolatile memory region and a volatile memory region. The main memory 202 stores the operating system or the application program in the nonvolatile memory region. In addition, the main memory 202 can store data which is necessary for the processor 201 to perform processing for controlling each unit, in the nonvolatile memory region or the volatile memory region. The main memory 202 uses the volatile memory region as a work area in which data is appropriately rewritten by the processor 201.

The auxiliary memory device 203 is an auxiliary memory unit of the user terminal 20. The auxiliary memory device 203 is, for example, an electric erasable programmable read-only memory (EEPROM), a hard disc drive (HDD), a solid state drive (SSD), or the like. The auxiliary memory device 203 stores data which is used for the processor 201 to perform various processing, or data which is generated by the processor 201. The auxiliary memory device 203 can also store the application program.

The touch panel 204 functions as an input device and a display device of the user terminal 20. The touch panel 204 displays, among other things, an icon which can be operated to start the application program.

The camera 205 has a resolution to the extent that a barcode can be imaged.

The wireless unit 206 performs data communication with the repeater 16 using wireless communication. For example, an information processing device in which the camera unit 205 and the wireless unit 206 are embedded, such as a smart phone, a mobile phone, and a tablet terminal, can be used as the user terminal 20.

The user terminal 20 having the aforementioned configuration becomes a terminal of the shopping support system 10 when a shopping support program P1 is installed. The shopping support program P1 causes the processor 201 to control the units of the user terminal 20 such that the user terminal 20 becomes a terminal of the shopping support system 10. The shopping support program P1 is stored in the auxiliary memory device 203.

Figure 9:
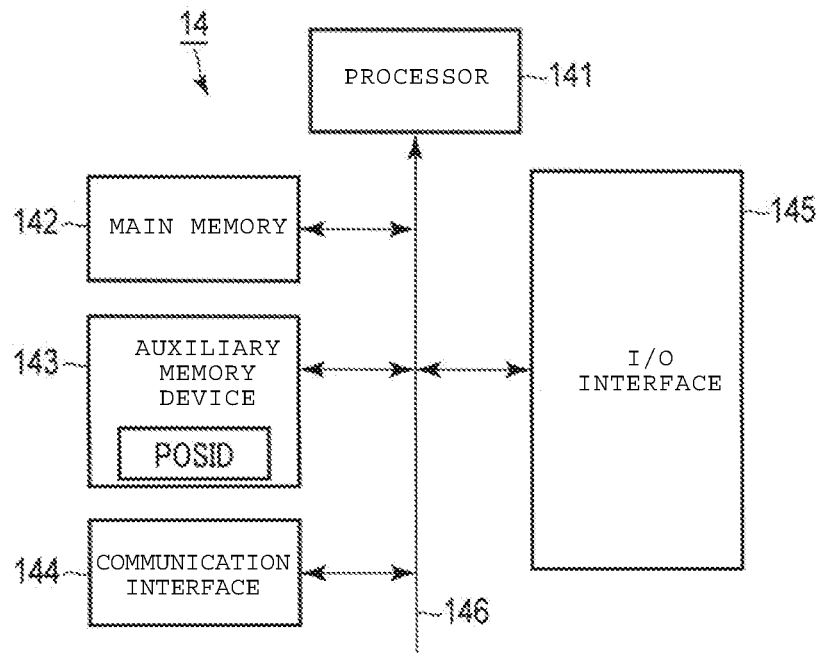
FIG. 9 is a block diagram illustrating a configuration of a POS terminal of the shopping support system of FIG. 1.

FIG. 9 is a block diagram illustrating a main configuration of the POS terminal 14. The POS terminal 14 includes a processor 141, a main memory 142, an auxiliary memory device 143, a communication interface 144, an input/output (I/O) interface 145, and the like. The processor 141, the main memory 142, the auxiliary memory device 143, the communication interface 144, and the I/O interface 145 are connected to each other through a system transmission path 146 including an address bus, a data bus, a control signal line, or the like.

The POS terminal 14 constitutes a computer with the processor 141, the main memory 142, the auxiliary memory device 143, and the system transmission path 146 connecting the processor, the main memory, and the auxiliary memory device to each other.

The processor 141 is the main processor of the POS terminal 14. The processor 141 controls each unit according to an operating system or an application program, so as to perform various functions of the POS terminal 14. Thus, the processor 141 functions as a controller for the POS terminal 14 and all the units thereof.

The main memory 142 is a main memory unit of the POS terminal 14. The main memory 142 includes a nonvolatile memory region and a volatile memory region. The main memory 142 stores the operating system or the application program in the nonvolatile memory region. In addition, the main memory 142 can store data which is necessary for the processor 141 to perform processing for controlling each unit, in the nonvolatile memory region or the volatile memory region. The main memory 142 uses the volatile memory region as a work area in which data is appropriately rewritten by the processor 141.

The auxiliary memory device 143 is an auxiliary memory unit of the POS terminal 14. The auxiliary memory device 143 is, for example, an EEPROM, an HDD, an SSD or the like. The auxiliary memory device 143 stores data which is used for the processor 141 to perform various processing, or data which is generated by the processor 141. The auxiliary memory device 143 can also store the application program.

The communication interface 144 is a data communication interface which links the respective servers 11, 12, and 13 and the like which are connected through the LAN 17.

The I/O interface 145 is a data communication interface which links various input and output devices. Generally, a scanner, a keyboard, a display for an operator, a display for a customer, a printer for receipt printing, or the like is connected to the I/O interface 145.

The POS terminal 14 stores POSID in the auxiliary memory device 143. The POS terminal 14 may also store the POSID in the main memory 142. The POSID is unique information that identifies the POS terminal 14. When the shopping support system 10 includes multiple POS terminals 14, a different POSID is used for each POS terminal 14. The respective servers 11, 12, and 13 identify the POS terminal 14 using the POSID.

The POS terminal 14 has a barcode indicating the POSID of the POS terminal 14. The barcode is located at any convenient location on the POS terminal 14. A two-dimensional data code may be used instead of the barcode.

Figure 10:
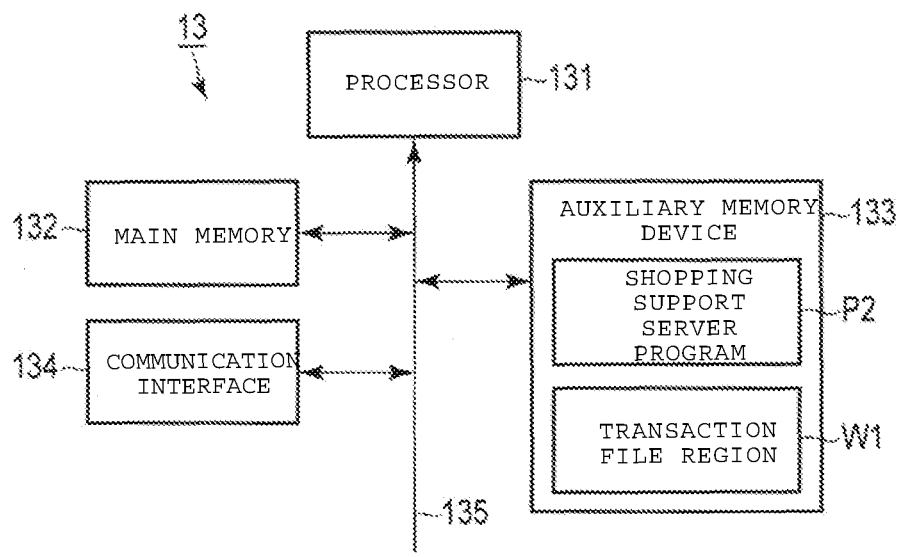
FIG. 10 is a block diagram illustrating a configuration of a shopping support server of the shopping support system of FIG. 1.

FIG. 10 is a block diagram illustrating a main configuration of the support server 13. The support server 13 includes a processor 131, a main memory 132, an auxiliary memory device 133, a communication interface 134, and the like. The processor 131, the main memory 132, the auxiliary memory device 133, and the communication interface 134 are connected to each other through a system transmission path 135 including an address bus, a data bus, a control signal line, or the like.

The support server 13 constitutes a computer with the processor 131, the main memory 132, the auxiliary memory device 133, and the system transmission path 135 connecting the processor, the main memory, and the auxiliary memory device to each other.

The processor 131 is the main processor of the support server 13. The processor 131 controls each unit according to an operating system or an application program, so as to perform various functions of the support server 13. Thus, the processor 131 functions as a controller for the support server 13 and all the units thereof.

The main memory 132 is a main memory unit of the support server 13. The main memory 132 includes a nonvolatile memory region and a volatile memory region. The main memory 132 stores the operating system or the application program in the nonvolatile memory region. In addition, the main memory 132 can store data which is necessary for the processor 131 to perform processing for controlling each unit, in the nonvolatile memory region or the volatile memory region. The main memory 132 uses the volatile memory region as a work area in which data is appropriately rewritten by the processor 131.

The auxiliary memory device 133 is an auxiliary memory unit of the support server 13. The auxiliary memory device 133 is, for example, an EEPROM, an HDD, an SSD or the like. The auxiliary memory device 133 stores data which is used for the processor 131 to perform various processing, or data which is generated by the processing of the processor 131. The auxiliary memory device 133 can also store the application program.

The communication interface 134 is a data communication interface which links other servers 11 and 12, the POS terminal 14, the information terminal 15 or the repeater 16 which are connected through the LAN 17.

The support server 13 operates on a shopping support server program P2 installed using the auxiliary memory device 133. In addition, the support server 13 forms a transaction file region W1 in the auxiliary memory device 133.

The shopping support server program P2 is stored in the support server 13 at all times. The shopping support server program P2 supports a shopper, in cooperation with the shopping support program P1 which is executed by the user terminal 20, providing health information regarding food items selected by the shopper.

Figure 11:
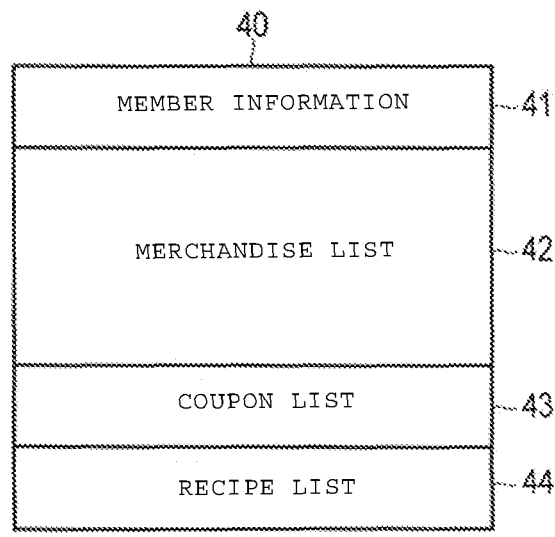
FIG. 11 is a schematic diagram illustrating a data structure of a transaction file.

The transaction file region W1 stores a transaction file 40 having a data structure illustrated in FIG. 11. The transaction file 40 is generated for each shopper. The support server 13 can simultaneously store multiple transaction files 40 in the transaction file region W1.

Data of the transaction file 40 includes member information 41, a merchandise list 42, a coupon list 43, and a recipe list 44. Detail of the data will be apparent in the description of an operation of the shopping support system 10.

Figure 12:
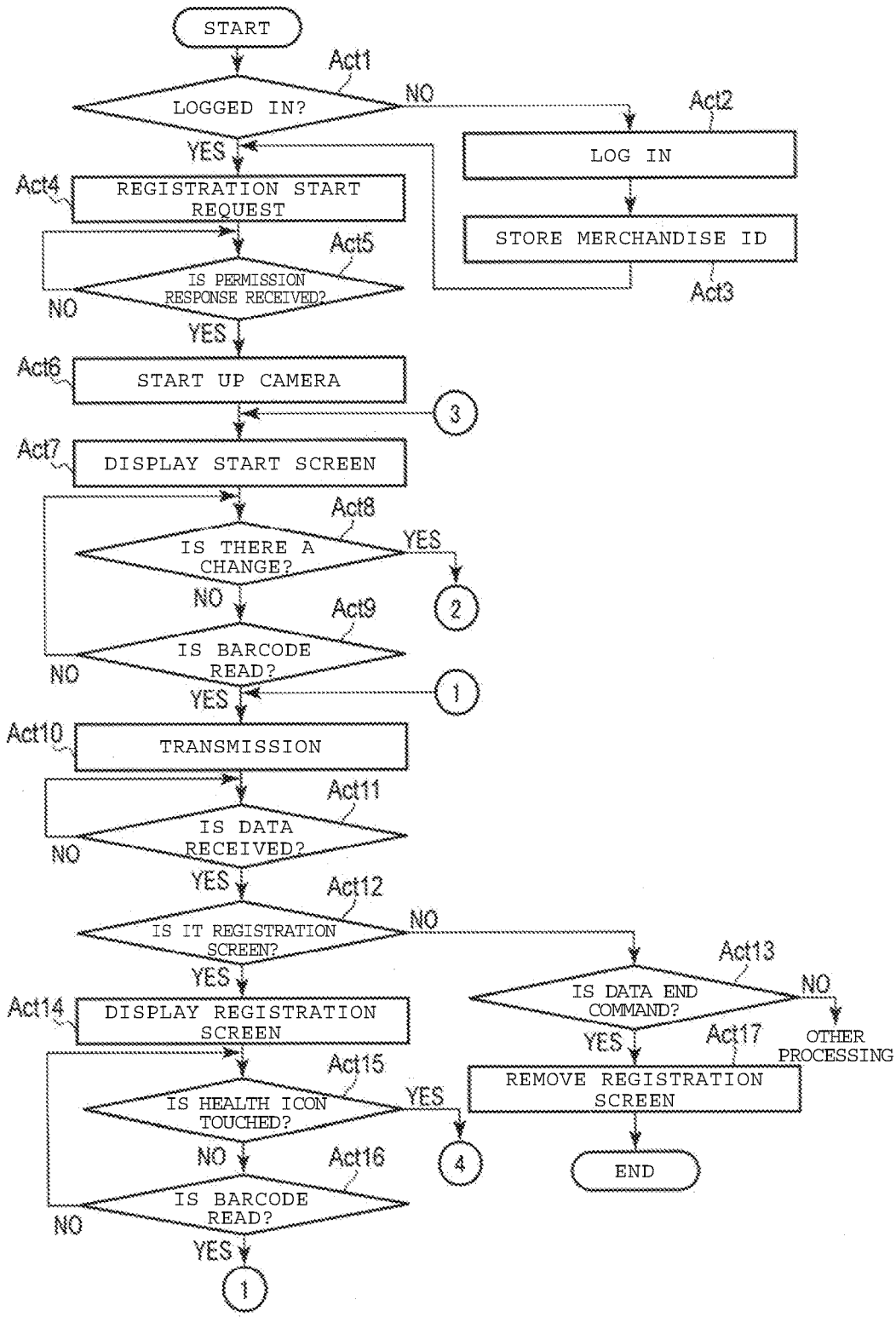
FIG. 12 is a flowchart illustrating a process performed by a processor of the user terminal of FIG. 8.
Figure 13:
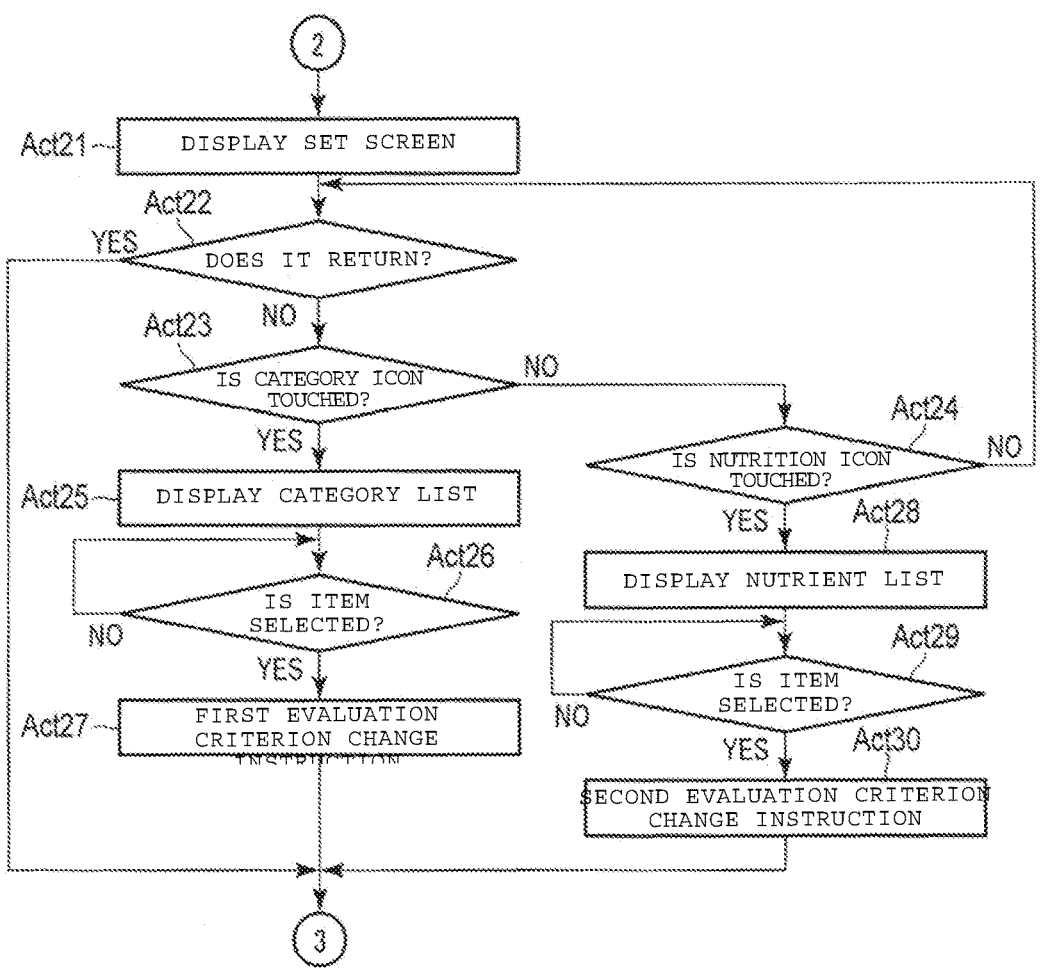
FIG. 13 is a flowchart illustrating another process performed by the user terminal of FIG. 8.
Figure 14:
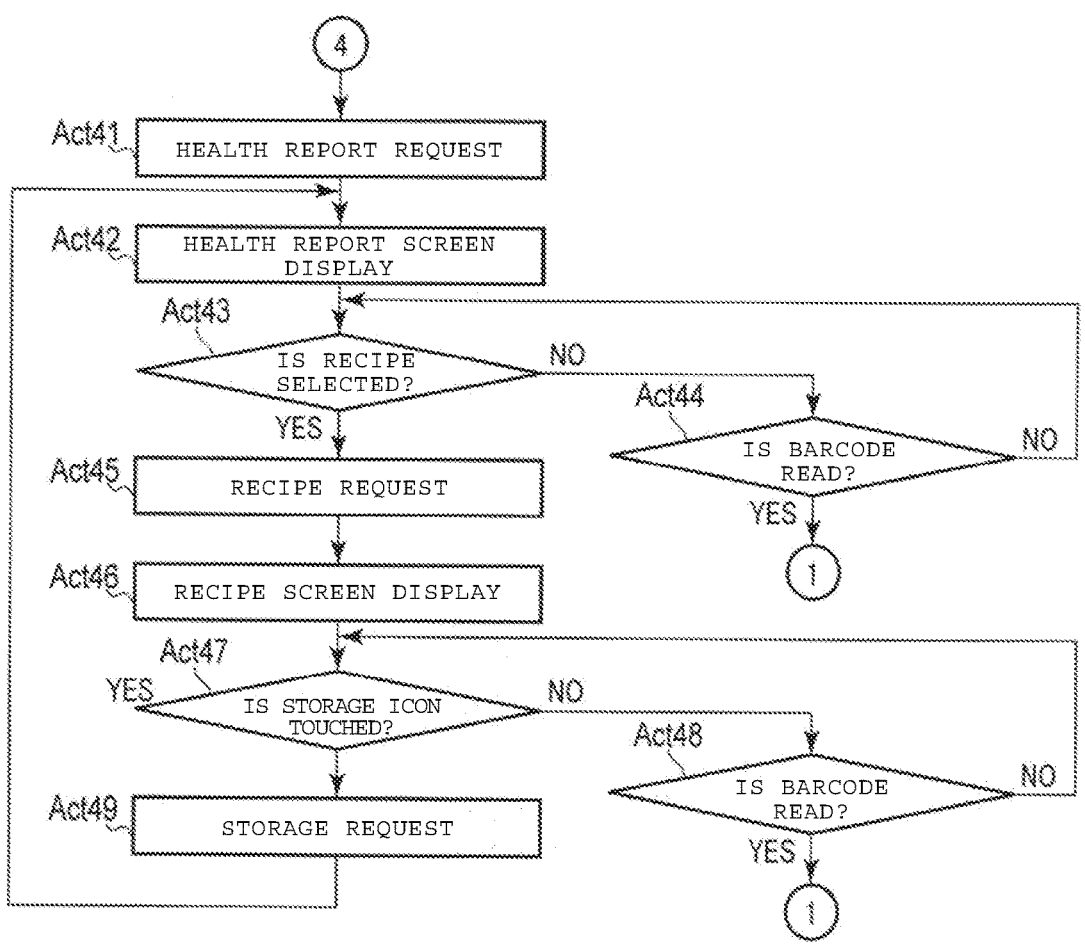
FIG. 14 is a flowchart illustrating another process performed by the user terminal of FIG. 8.
Figure 15:
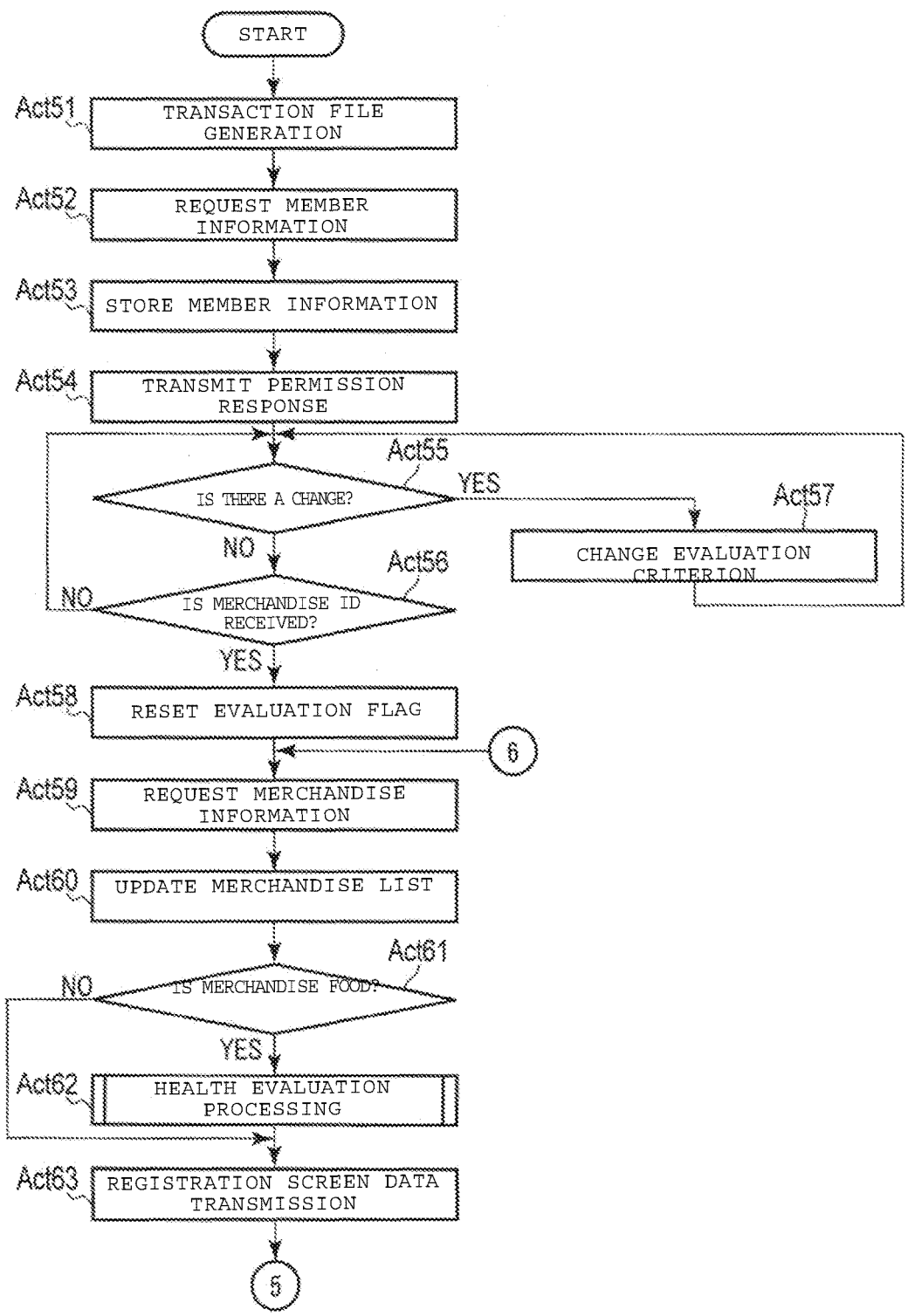
FIG. 15 is a flowchart illustrating a process performed by the shopping support server of FIG. 10.
Figure 16:
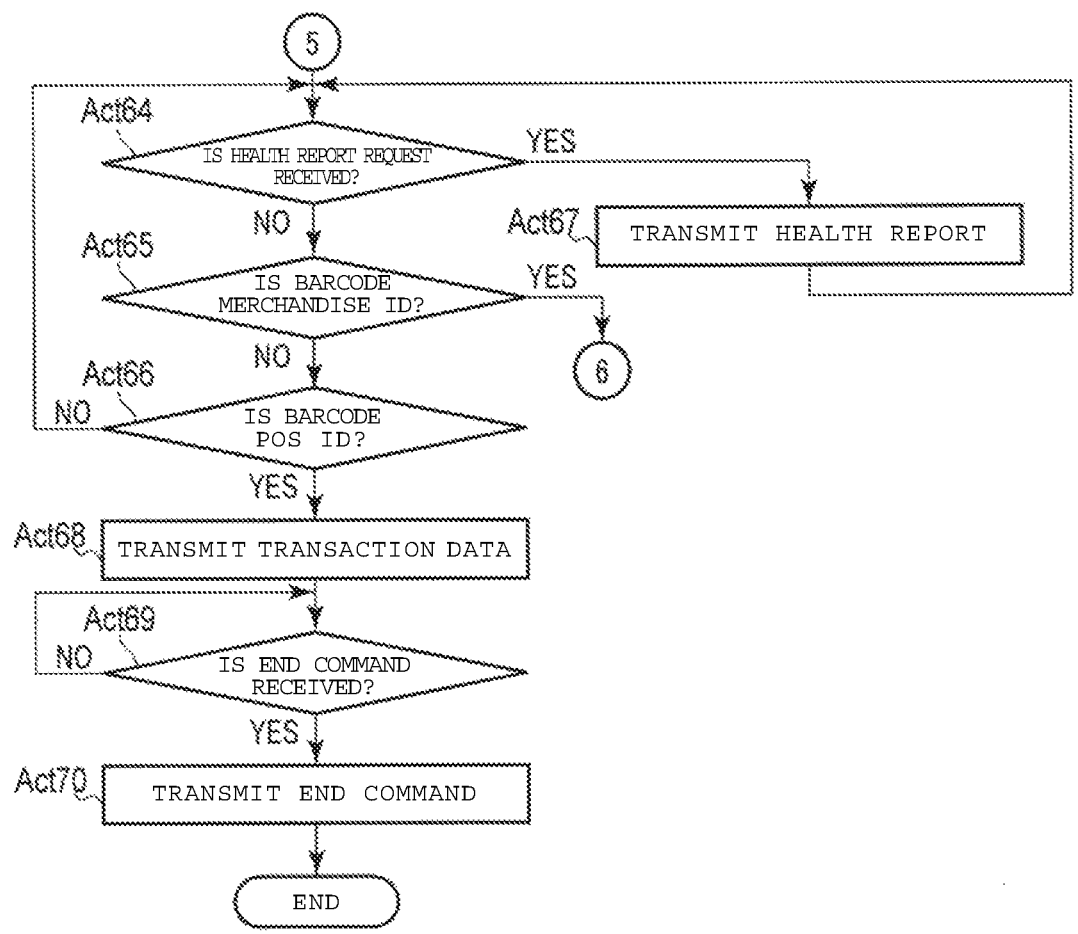
FIG. 16 is a flowchart illustrating another process performed by the shopping support server of FIG. 10.
Figure 17:
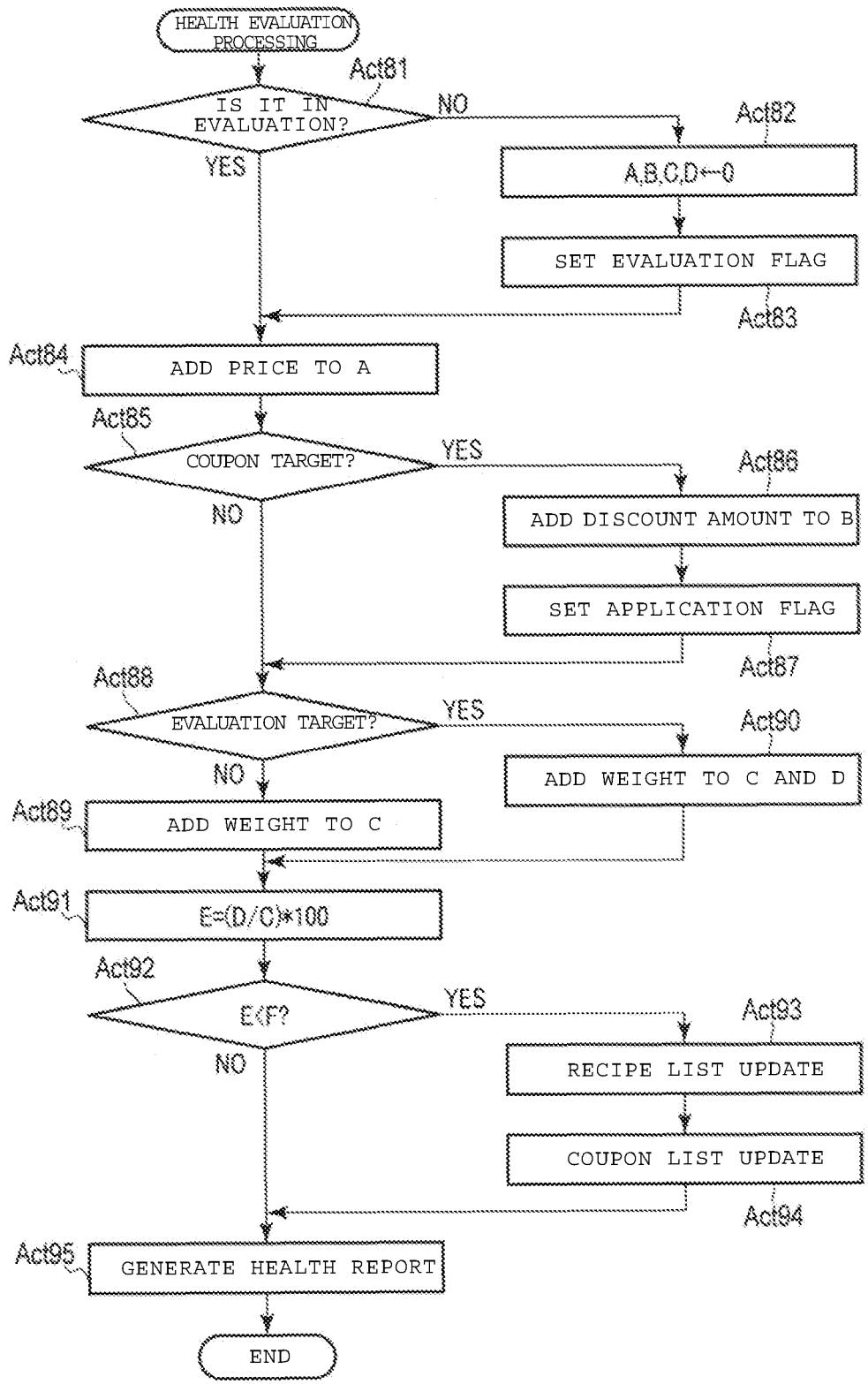
FIG. 17 is a flowchart illustrating another process performed by the shopping support server of FIG. 10.
Figure 18:
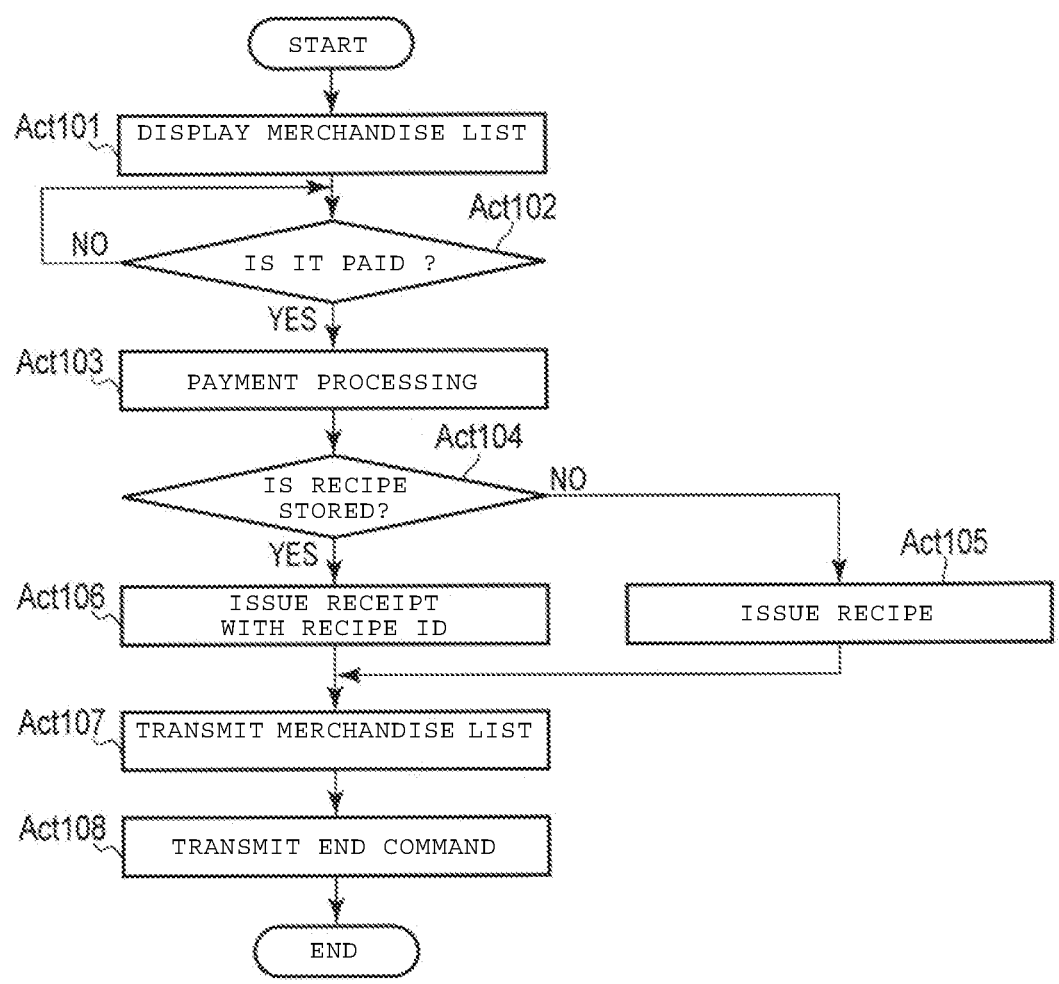
FIG. 18 is a flowchart illustrating a process performed by the POS terminal of FIG. 9.

Next, an operation of the shopping support system 10 will be described with reference to FIG. 12 to FIG. 26. FIG. 12 to FIG. 14 are flowcharts illustrating processes performed by the processor 201 of the user terminal 20, according to the shopping support program P1. FIG. 15 to FIG. 17 are flowcharts illustrating processes performed by the processor 131 of the support server 13, according to the shopping support server program P2. FIG. 18 is a flowchart illustrating a process performed by the processor 141 of the POS terminal 14, according to the control program. FIG. 19 to FIG. 25 are schematic diagrams illustrating example screens that may be displayed on the touch panel 204 of the user terminal 20. FIG. 26 is a schematic diagram illustrating an example of a receipt which is issued by the POS terminal 14.

The processing contents which will be described below together with the flowcharts illustrated in FIG. 12 to FIG. 18 are examples, and various appropriate processing can obtain the same effects. In addition, screens illustrated in FIG. 19 to FIG. 25 and the content of the receipt illustrated in FIG. 26 are examples, and layout or the like can be appropriately changed.

Before a shopper starts shopping in a store, the shopper starts up the shopping support program P1 by operating the touch panel 204 of the user terminal 20. That is, the shopper touches an icon of the shopping support program P1 which is displayed on the touch panel 204. When the shopping support program P1 starts up, the processor 201 of the user terminal 20 starts the processing illustrated in the flowchart in FIG. 12.

The processor 201 first determines whether the user terminal 20 is logged-in to the support server 13 (Act1). If the user terminal 20 was not logged-out after the previous shopper used the user terminal 20, the user terminal 20 might still be logged-in to the support server 13. When the user terminal 20 is logged-in, a member ID which is an authentication ID is stored in the auxiliary memory device 203.

When the user terminal 20 is not logged-in to the support server 13 (NO in Act1), the processor 201 displays a log-in screen on the touch panel 204, and receives log-in (Act2). The shopper logs-in by inputting his member ID onto the log-in screen. The shopper may input a password together with the member ID.

When the log-in is performed, the processor 201 controls the wireless unit 206 such that log-in information including the member ID is transmitted to the support server 13. By this control, the log-in information is transmitted from the wireless unit 206 to the support server 13. The log-in information is received by the repeater 16, and transmitted to the support server 13 through the LAN 17.

The support server 13 performs log-in authentication. In addition, the support server 13 notifies the user terminal 20 of the authentication result.

When the log-in is approved, the processor 201 stores the member ID used in the log-in in the auxiliary memory device 203 (Act3). The member ID may also be stored in the main memory 202 rather than the auxiliary memory device 203.

If the user terminal 20 was previously logged-in (YES in Act1), the shopper must log the user terminal 20 out before the processor 201 can perform the aforementioned processing of Act2 and Act3.

When the log-in is approved in Act2 and Act3 and the support server 13 reflects that the user terminal 20 is logged-in, the processor 201 controls the wireless unit 206 such that a registration start request is transmitted to the support server 13 (Act4). By this control, the registration start request is wirelessly transmitted from the wireless unit 206 to the support server 13. The registration start request includes the member ID that was used for log-in. The registration start request is received by the repeater 16, and transmitted to the support server 13 through the LAN 17.

The processor 131 of the support server 13, according to the support server program P2, waits for the registration start request. When the registration start request is received, the processor 131 starts in the process of FIG. 15 and FIG. 16.

The processor 131 first generates an empty transaction file 40 in the transaction file region W1 of the auxiliary memory device 133 (Act51).

The processor 131 controls the communication interface 134 such that member information is requested from the member server 12 (Act52). By this control, a member information request is addressed to the member server 12 from the communication interface 134 through the LAN 17. The member information request includes the member ID from the registration start request.

The member information request is received by the member server 12. The member server 12 accesses the member information database 33, and reads the member information record 33R corresponding to the member ID from the member information request. The member server 12 transmits the member information record 33R to the support server 13 that sent the member information request.

The processor 131 of the support server 13 that sent the member information request waits for the member information record 33R to be returned. When the member information record 33R is received through the communication interface 134, the processor 131 adds information from the member information record 33R to the transaction file 40 generated at Act51 (Act53). Member information 41, such as personal data, evaluation category, the number of items n, item IDs, and the like is added to the transaction file 40.

The processor 131 which adds the member information 41 to the transaction file 40 controls the communication interface 134 such a permission response is transmitted to the user terminal 20 in response to the registration start request (Act54). By this control, a permission response signal is sent to the user terminal 20 that sent the registration start request by the communication interface 134 through the LAN 17. The permission response signal is wirelessly transmitted from the repeater 16, and is received by the wireless unit 206 in the user terminal 20 that sent the registration start request.

The processor 201 of the user terminal 20 that sent the registration start request waits for the permission response (Act5). When the permission response is received from the support server 13 through the wireless unit 206 (YES in Act5), the processor 201 activates the camera unit 205 (Act10). In addition, the processor 201 changes the screen of the touch panel 204 to a start screen SC1 (Act7).

Figure 19:
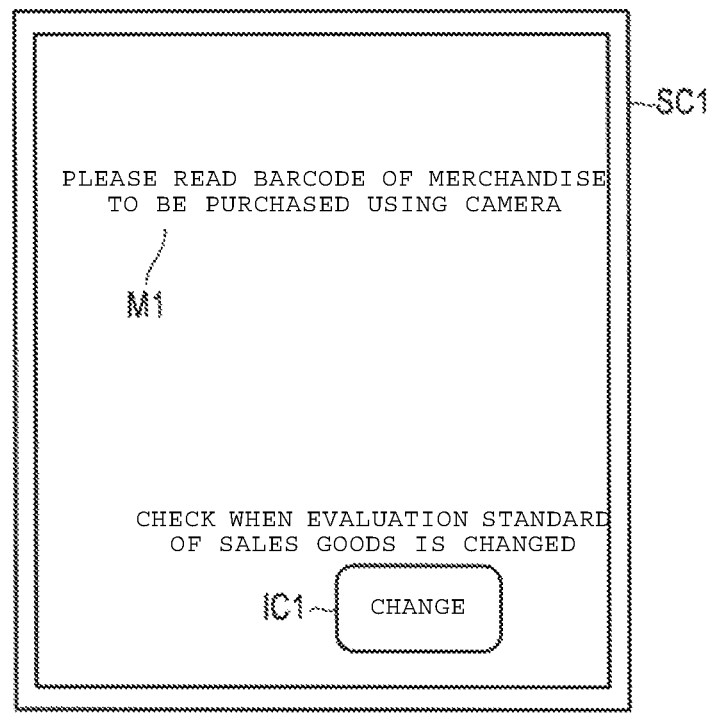
FIG. 19 is a schematic diagram illustrating an example of a start screen displayed on a touch panel of the user terminal of FIG. 8.

FIG. 19 is an example of the start screen SC1. As illustrated in FIG. 19, a change icon IC1 is displayed on the start screen SC1 together with a message M1 to a shopper who is a user. The message M1 guides the shopper to use the camera 205 of the user terminal 20 to read a barcode of merchandise to be purchased. The change icon IC1 allows the shopper to change how health evaluation of merchandise is performed from the default method preset in the member information record 33R.

The processor 201 confirms whether the change icon IC1 is touched (Act8). When the change icon IC1 is not touched (NO in Act8), the processor 201 confirms whether the barcode is read through the camera unit 205 (Act9). When the barcode is not read (NO in Act9), the processor 201 confirms again whether or not the change icon IC1 is touched (Act8). Here, the processor 201 waits for touching of the change icon IC1 and reading of the barcode by repeated processing of Act8 and Act9.

If the shopper wants to change the evaluation criterion used to evaluate nutritional balance of the shopper's selections, the shopper touches the change icon IC1. When a touch of the change icon IC1 is sensed by the touch panel 204 (YES in Act8), the processor 201 performs the process illustrated in the flowchart in FIG. 13. That is, the processor 201 switches the screen of the touch panel 204 from the start screen SC1 to a select screen SC2.

Figure 20:
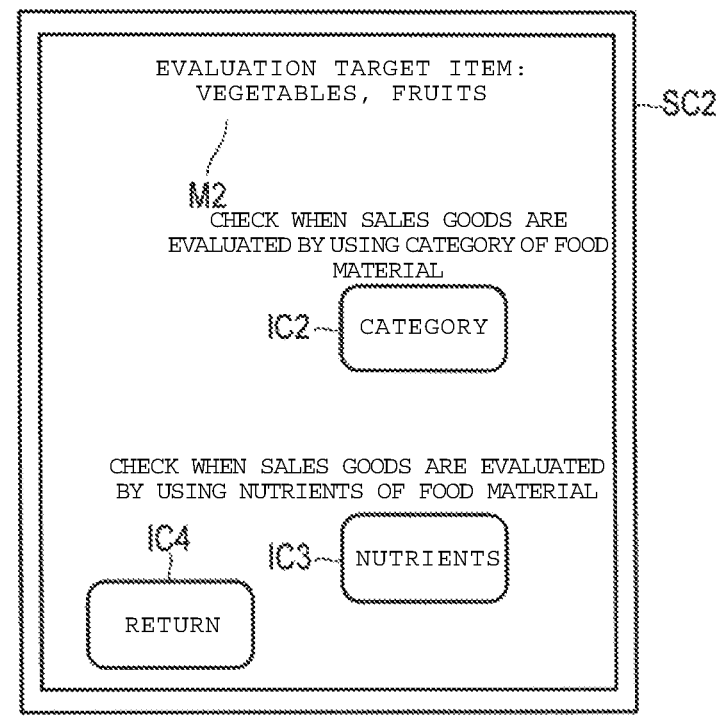
FIG. 20 is a schematic diagram illustrating an example of a setting screen displayed on a touch panel of the user terminal of FIG. 8.

FIG. 20 is an example of the select screen SC2. As illustrated in FIG. 20, a category icon IC2, a nutrient icon IC3, and a back icon IC4 are displayed on the select screen SC2 together with a message M2 to the shopper. The message M2 notifies the shopper of the present evaluation criterion, which may be the evaluation criterion from the member information record 33R. FIG. 20 illustrates the select screen SC2 with respect to the shopper in which "vegetables" and "fruits" are preset in the member information record 12R as the food types used for the food type evaluation criterion. The shopper touches the category icon IC2 or the nutrient icon IC3 to select the evaluation criterion to be used. The back icon IC4 returns the screen to the start screen SC1.

The processor 201 confirms whether the back icon IC4 is touched (Act22). When the back icon IC4 is not touched (NO in Act22), the processor 201 confirms whether the category icon IC2 is touched (Act23). When the category icon IC2 is not touched (NO in Act23), the processor 201 confirms whether the nutrient icon IC3 is touched (Act24). When the nutrient icon IC3 is not touched (NO in Act24), the processor 201 confirms again whether the back icon IC4 is touched (Act22). Thus, the processor 201 waits for touching of the back icon IC4, touching of the category icon IC2, and touching of the nutrient icon IC3, by repeatedly processing Act22, Act23, and Act24.

The shopper does not have to select the category icon IC2 or the nutrient icon IC3. If the shopper does not want to change the evaluation criterion, the shopper touches the back icon IC4. When touching of the back icon IC4 is sensed by the touch panel 204 (YES in Act22), the processor 201 returns to Act7 in FIG. 12. That is, the processor 131 returns the screen of the touch panel 204 to the start screen SC1.

When the shopper wishes to change the evaluation criterion, the shopper touches the category icon IC2 or the nutrient icon IC3. That is, when food type is selected as a new evaluation criterion, the shopper touches the category icon IC2. When the nutrients are set as a new evaluation criterion, the shopper touches the nutrient icon IC3.

When touching of the category icon IC2 is sensed by the signal from the touch panel 204 (YES in Act23), the processor 201 displays a list of food types on the touch panel 204 (Act25). The shopper selects a food type to serve as a basis for evaluation, and touches the item in the list. Only one item may be selected or multiple items may be selected.

The processor 201 waits for the shopper to select from the list of food types (Act26). When a selection is detected by the touch panel 204 (YES in Act26), the processor 201 controls the wireless unit 206 such that a first change instruction is transmitted to the support server 13 (Act27). The first change instruction includes data indicating that the shopper has selected food type as the evaluation criterion and the item(s) from the list of food types, together with the member ID. The first change instruction is received by the repeater 16 and transmitted to the support server 13 through the LAN 17.

If the shopper selects the nutrient icon IC3, as sensed by the signal from the touch panel 204 (YES in Act24), the processor 201 displays a nutrient list on the touch panel 204 (Act28). The shopper selects one or more a nutrient items from the list The processor 201 waits for the shopper to select an item from the nutrient list (Act29). When the touch panel 204 detects a selection from the nutrient list (YES in Act29), the processor 201 controls the wireless unit 206 such that a second change instruction is transmitted to the support server 13 (Act30). The second change instruction includes data indicating that the shopper has selected nutrients as the evaluation criterion and one or more nutrients from the nutrient list, together with the member ID. The second change instruction is received by the repeater 16 and transmitted to the support server 13 through the LAN 17.

In Act54 in FIG. 15, the processor 131 of the support server 13 confirms whether or not the first or the second change instruction is received (Act55). When the change instruction is not received (NO in Act55), the processor 131 confirms whether the merchandise ID is received (Act56). When the merchandise ID is not received (NO in Act56), the processor 131 confirms again whether the change instruction command is received (Act55). Thus, the processor 131 waits for receiving of the change instruction and receiving of the merchandise ID by repeatedly processing Act55 and Act56.

While waiting at Act55 and Act56, when the first change instruction is received (YES in Act55), the processor 131 changes the evaluation criterion in the member information 41 of the transaction file 40 corresponding to the member ID included in the instruction (Act57). That is, the processor 131 changes evaluation criterion to "1" if the shopper has selected food type as the evaluation criterion. In addition, the processor 131 changes the item number n to the number of food types selected from the food type list. Furthermore, the processor 201 changes the item ID to a merchandise type ID of the food type selected from the food type list.

When the second change instruction is received (YES in Act55), the processor 131 changes the evaluation criterion in the member information 41 of the transaction file 40 corresponding to the member ID in the instruction (Act57). That is, the processor 131 changes evaluation criterion to "2" indicating nutrients. In addition, the processor 201 changes the item number n to the number of nutrients selected from the nutrient list. Furthermore, the processor 201 changes the item ID to a nutrient ID of the nutrients selected from the nutrient list.

In Act27 or Act30 in FIG. 13, the processor 201 returns to Act7 in FIG. 12. That is, the processor 131 returns the screen of the touch panel 204 to the start screen SC1. At this time, the current evaluation criterion is displayed by the message M2.

The shopper, upon confirming the evaluation criterion displayed in the message M2 on the start screen SC1 is correct, starts shopping. That is, the shopper images a barcode of merchandise to be purchased using the camera unit 205 and places the merchandise in the shopping cart.

While waiting at Act8 or Act9 in FIG. 12, when the barcode is read by the camera 205 (YES in Act9), the processor 201 controls the wireless unit 206 such that data of the barcode is transmitted to the support server 13 (Act10) along with the member ID. The barcode data is received by the repeater 16, and transmitted to the support server 13 through the LAN 17.

While waiting at Act55 or Act56 in FIG. 15, when the barcode data received from the user terminal 20 is a merchandise ID (YES in Act56), the processor 131 sets an evaluation flag to "0" (Act58). The evaluation flag identifies whether or not health evaluation processing (described further below) was performed with respect to the merchandise corresponding to the merchandise ID. The evaluation flag may be one bit which is stored in a nonvolatile region of the main memory 132.

The processor 131 controls the communication interface 134 such that merchandise information is requested from the POS server 11 (Act59). By this control, a merchandise information request is sent to the POS server 11 from the communication interface 134 through the LAN 17. The merchandise information request includes the merchandise ID from the barcode.

The merchandise information request is received by the POS server 11. Then, the POS server 11 accesses the merchandise information database 31 to read the merchandise information record 31R corresponding to the merchandise ID from the merchandise information request. The POS server 11 transmits the merchandise information record 31R to the support server 13 that sent the merchandise information request.

The processor 131 of the support server 13 that sent the merchandise information request waits for the merchandise information record 31R to be returned. When the merchandise information record 31R is received through the communication interface 134, the processor 131 updates the merchandise list 42 of the transaction file 40 which is generated in Act51 (Act60). Specifically, the processor 131 generates merchandise data by adding an amount, a unit price, and a discount amount to the merchandise ID, the merchandise type ID, the merchandise name, and the unit price from the merchandise information record 31R. Initially, the amount is "1", the price is obtained by multiplying the unit price by the amount, and the discount amount is "0". The processor 131 adds the merchandise data to the merchandise list 42. If the merchandise data to be added to the merchandise list 42 includes a merchandise ID already in the merchandise list 42, only the amount, the unit price, and the discount amount are updated in the merchandise list 42.

Thus, the processor 131 builds the merchandise list 42 by processing Act56 to Act60.

After the merchandise list 42 is updated, the processor 131 determines, based on the merchandise type ID of the merchandise data whether or not the merchandise is food (Act61). When the merchandise is food (YES in Act61), the processor 131 performs health evaluation processing (Act62) regarding the merchandise. When the merchandise is not food (NO in Act61), the processor 131 does not perform health evaluation processing. The health evaluation processing will be described in detail below.

When the health evaluation processing ends or the health evaluation processing is not performed because the merchandise is not food, the processor 131 controls the communication interface 134 such that registration screen data is transmitted to the user terminal 20 that sent the barcode data (Act63) through the LAN 17. The registration screen data includes the merchandise data generated at Act60, and a total amount of money due for the merchandise data registered in the merchandise list 42. The registration screen data is wirelessly transmitted from the repeater 16, and is received by the wireless unit 206 in the user terminal 20 that sent the barcode data.

The processor 201 of the user terminal 20 that sent the barcode data waits for data from the support server 13 (Act11). When the data is received (YES in Act11), the processor 201 confirms whether the data is the registration screen data (Act12). When the data is not the registration screen data (NO in Act12), the processor 201 confirms whether the data is an end command which will be described below (Act13). When the data is not the end command (NO in Act13), the processor 201 performs processing according to the received data.

When the received data is the registration screen data (YES in Act12), the processor 131 switches the screen of the touch panel 204 to a registration screen SC3 (Act14).

Figure 21:
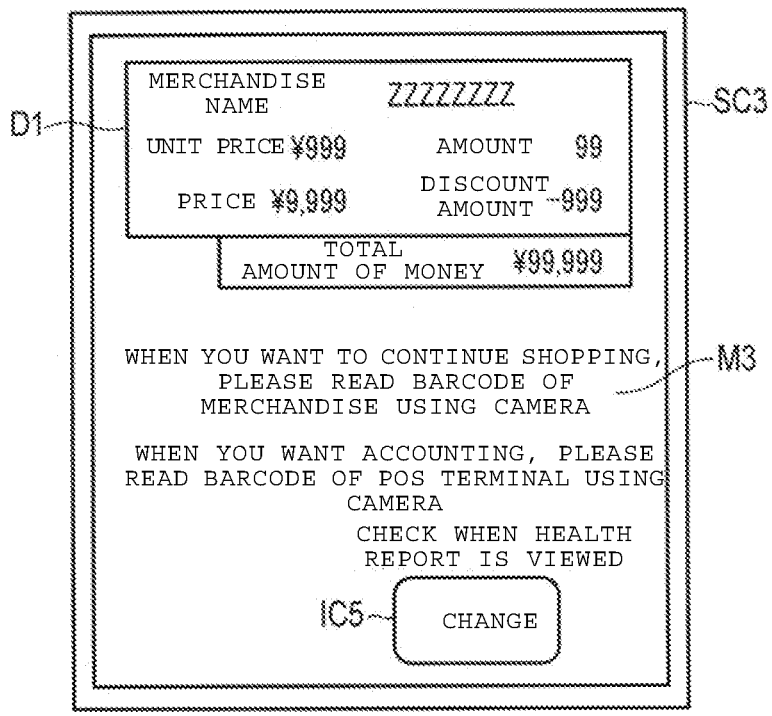
FIG. 21 is a schematic diagram illustrating an example of a registration screen displayed on a touch panel of the user terminal of FIG. 8.

FIG. 21 is an example of the registration screen SC3. As illustrated in FIG. 21, the registration screen SC3 displays a merchandise name, a unit price, an amount, a discount amount, or the like which is included in merchandise data D1. In addition, the registration screen displays the total amount currently due. Furthermore, the registration screen SC2 displays a health icon IC5 together with a message M3 to the shopper. The message M3 guides the shopper to use the camera 205 to image a barcode (merchandise ID) of merchandise to be purchased for registration or for display on the POS terminal 14. The health icon IC5 is touched by a user, when viewing of a health report is requested.

The processor 201 confirms whether the health icon IC5 is touched (Act15). When the health icon IC5 is not touched (NO in Act15), the processor 201 confirms whether a barcode is read by the camera 205 (Act16). When the barcode is not read (NO in Act16), the processor 201 confirms again whether the health icon IC5 is touched (Act15). Thus, the processor 201 waits for touching of the health icon IC5 and reading of the barcode by repeatedly processing Act15 and Act16.

While waiting at Act15 and Act16, when touching of the health icon IC5 is sensed by the touch panel 204 (YES in Act15), the processor 201 performs the process illustrated in the flowchart in FIG. 14. That is, the processor 201 controls the wireless unit 206 such that a health report request, including the member ID, is transmitted to the support server 13 (Act41). The health report request command is received by the repeater 16, and transmitted to the support server 13 through the LAN 17.

While waiting at Act15 and Act16, when the barcode is read (YES in Act16), the processor 201 returns to Act10 and controls the wireless unit 206 to transmit the barcode to the support server 13.

As illustrated in FIG. 16, the processor 131 confirms whether the health report request is received (Act64). When the health report request is not received (NO in Act64), the processor 131 confirms whether the merchandise ID is received (Act65). When the merchandise ID is not received (NO in Act65), the processor 131 confirms whether the POS ID is received (Act66). When the POS ID is not received (NO in Act66), the processor 131 confirms again whether the health report request is received (Act64). Here, the processor 131 waits for receiving of the health report request, the merchandise ID, and the POS ID, by repeatedly processing Act64 to Act66.

While waiting at Act64 to Act66, when the health report request is received (YES in Act64), the processor 131 controls the communication interface 134 to transmit the health report request through the LAN 17 to the user terminal 20 that sent the health report request (Act67). The data of the health report is wirelessly transmitted from the repeater 16, and received by the wireless unit 206 of the user terminal 20 that sent the health report request. The health report is generated by health evaluation processing which will be described below.

While waiting at Act64 to Act66, when the barcode received from the user terminal 20 is a merchandise ID (YES in Act65), the processor 131 returns to Act59 in FIG. 15. That is, the processor 131 controls the communication interface 134 such that the merchandise ID is sent to the POS server 11 with a request for the merchandise information record 31R. When the merchandise information record 31R is received, the processor 131 updates the merchandise list 42. Thus the processor 131 functions as a merchandise list unit that lists merchandise a shopper plans to purchase. When the merchandise is food, the processor 131 performs health evaluation processing.

Here, the health evaluation processing will be described with reference to FIG. 17.

When the user terminal 20 reads a merchandise ID of a food item, merchandise data of food is generated, and the merchandise list is updated by the support server 13, the processor 131 of the support server 13 starts health evaluation processing.

The processor 131 first confirms whether or not the evaluation flag is set to "1" (Act81). When the evaluation flag is set to "0" (NO in Act81), the processor 131 initializes all the work areas A, B, C, and D of the main memory 132 as "0" (Act82) and then sets the evaluation flag to "1" (Act83). The processing of Act82 and Act83 may be reversed. That is, Act83 may be performed before Act82.

When the evaluation flag is set to "1" (YES in Act81), the processor 131 does not perform the processing of Act82 and Act83. When the processing of Act82 and Act83 ends or the evaluation flag is set to "1," the processor 131 adds the price of the merchandise to the work area A (Act84).

Then, the processor 131 determines whether or not the merchandise is of the subject of a coupon (Act85). That is, the processor 131 searches for the coupon list 43 of the transaction file 40, and determines whether or not the merchandise ID of the merchandise exists in the coupon list 43.

Coupon information records 35R from the coupon information database 35 are registered in the coupon list 43 at Act94, which will be described below. When the merchandise ID of the merchandise coincides with the merchandise ID included in a coupon information record 35R of the coupon list 43, the processor 131 determines that the merchandise ID of the merchandise exists in the coupon list 43.

When the merchandise ID of the merchandise exists in the coupon list 43 (YES in Act85), the processor 131 calculates a discount amount based on coupon type and a value of the coupon information record 35R. That is, when the coupon type is "1", the processor 131 ascertains the discount amount from the coupon information record 35R. When the coupon type is "2", the processor 131 calculates a discount amount based on the unit price, the discount rate, and the number of units of the merchandise. When the coupon type is "3", the processor 131 calculates a discount amount based on the unit price, the changed price and the number of units of the merchandise. The processor 131 adds the discount amount determined above to the work area B (Act86) and sets an application flag in the coupon information record 35R (Act87). The application flag may be one bit that indicates whether the coupon has been applied. The order of processing Act86 and Act87 may be reversed.

When the merchandise ID of the merchandise is not in the coupon list 43 (NO in Act85), the processor 131 does not perform the processing of Act86 and Act87. When the processing of Act86 and Act87 ends or the merchandise ID of the merchandise is not in the coupon list, the processor 131 determines whether or not the merchandise corresponds to the shopper's evaluation criteria (Act88). That is, the processor 131 searches for the member information 41 of the transaction file 40, and determines whether or not the merchandise ID of the merchandise relates to an item ID of the member information 41.

When the item ID is equal to the merchandise ID, the evaluation is based on the merchandise identified by the merchandise ID. When the item ID is a merchandise type ID, the evaluation is based on merchandise having the specified merchandise type ID.

Thus, the processor 131 functions as a merchandise evaluation unit which determines whether or not the listed merchandise is a subject of evaluation according to the evaluation criterion, by processing Act88. Thus, the merchandise evaluation unit identifies merchandise listed by the merchandise list unit upon which the shopper has performed a health evaluation.

When the merchandise data does not correspond to the evaluation criterion or an item ID (NO in Act88), the processor 131 adds a weight of the merchandise data to the work area C (Act89). The weight is not added to the work area D at this time. In contrast, when the merchandise corresponds to the evaluation criterion or an item ID (YES in Act88), the processor 131 adds the weight of the merchandise data to the work area C and the work area D (Act90).

When the processing of Act89 or Act90 ends, the processor 131 calculates an evaluation value E % using the following Expression (1) (Act91). In Expression (1), C is a value of the work area C, and D is a value of the work area D.

$$E=(D/C)\times 100 \qquad (1)$$

As can be apparent from Expression (1), the evaluation value E % is a ratio between a total weight of the merchandise and a total weight of the merchandise that correspond to the evaluation criterion or an item ID. The higher the ratio is, the greater the weight of merchandise on which evaluation has been performed and the healthier the choices.

Thus, the processor 131 functions as a calculation unit which calculates a ratio between the listed merchandise and the evaluated merchandise by processing of Act89, Act90, and Act91.

The processor 131 determines whether the evaluation value E % is less than a predetermined threshold F (Act92). The threshold F is a value that defines healthy shopping with an excellent nutrient balance. When the evaluation value E % is equal to or greater than the threshold F, the shopping trip is regarded as healthy and well-balanced, and vice versa. The threshold F may be fixed for all shoppers, or may be a data value in the member information record 33R registered in the member information database 33 to provide a different threshold F for each shopper.

When the evaluation value E % is less than the threshold F (YES in Act92), the processor 131 updates the recipe list 44 of the transaction file 40 (Act93). That is, the processor 131 searches the recipe information database 36 for recipes including the merchandise ID existing in the merchandise list 42 that are not registered in the recipe list 44. At this time, the processor 131 preferentially selects recipe information records 36R that include merchandise ID's corresponding to the evaluation criterion. The processor 131 adds the selected recipe information record(s) 36R to the recipe list 44. If no recipe information record 36R is selected, the processor 131 does not update the recipe list 44. Thus, the processor 131 functions as a determining unit which finds recipes that use the listed merchandise as an ingredient by processing Act93. Thus, the processor 131 functions as a recipe unit that identifies recipes in which merchandise listed by the merchandise list unit is an ingredient.

Subsequently, the processor 131 updates the coupon list 43 of the transaction file 40 (Act94). That is, the processor 131 searches the coupon information database 35 for coupon information records 35R not registered in the coupon list 43 that have a merchandise ID corresponding to the evaluation criterion as a subject of the coupon and adds the selected coupon information records 35R to the coupon list 43. When no coupon information records 35R are selected, the processor 131 does not update the coupon list 43.

Thus, the processor 131 functions as a coupon unit that issues a coupon with respect to merchandise corresponding to the evaluation criterion, that is merchandise identified by the merchandise evaluation unit (evaluated merchandise), when the evaluation value is less than the threshold by processing Act94. In more detail, when the evaluation value is less than the threshold, the processor 131 issues a coupon with respect to merchandise corresponding to the evaluation criterion that is not in the listed merchandise but is in a selected recipe information record 36R.

When the evaluation value E % is equal to or greater than the threshold F (NO in Act92), the processor 131 does not perform the processing of Act93 and Act94. When the processing of Act93 and Act94 ends or the evaluation value E % is equal to or greater than the threshold F, the processor 131 generates image data of the health report based on data of the transaction file 40 and the evaluation value E % calculated by processing of Act91 (Act95). As described above, the processor 131 ends health evaluation processing.

The image data of the health report generated by the health evaluation processing is transmitted to the user terminal 20 that sent the health report request.

That is, in Act41 in FIG. 14, the processor 201 of the user terminal 20 that transmits the health report request waits for the image data of the health report. Then, when the image data of the health report is delivered through the wireless unit 206, the processor 201 changes a screen of the touch panel 204 to a health report screen SC4 (Act42).

Figure 22:
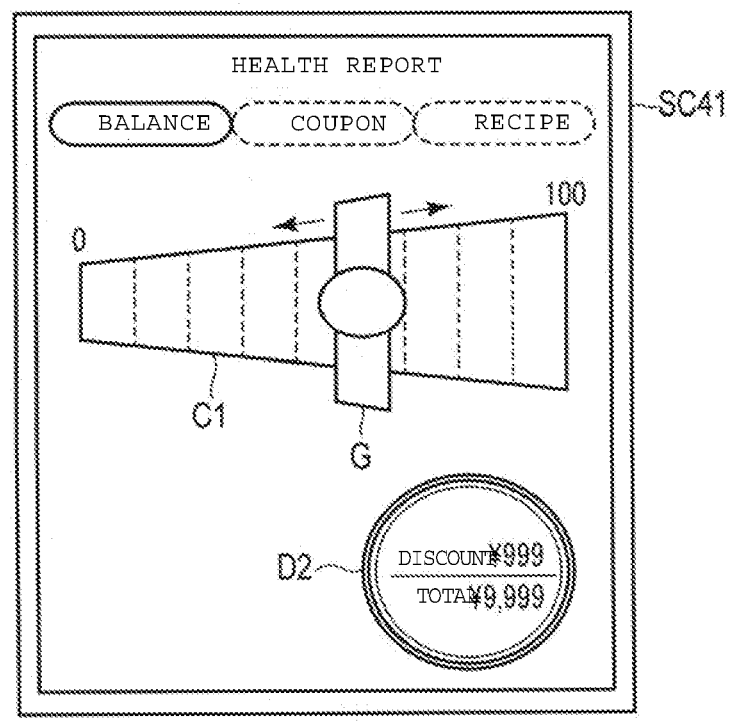
FIG. 22 is a schematic diagram illustrating an example of a balance screen displayed on a touch panel of the user terminal of FIG. 8.
Figure 23:
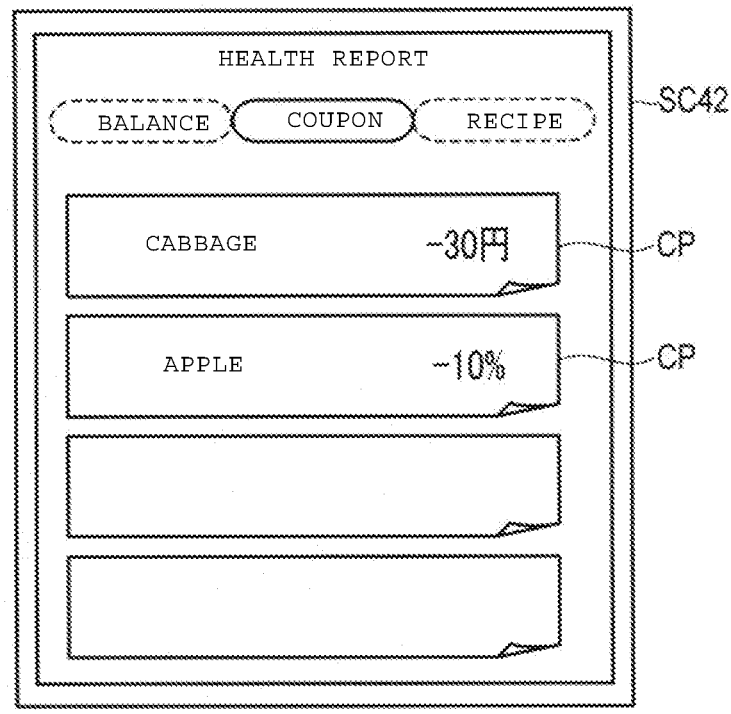
FIG. 23 is a schematic diagram illustrating an example of a coupon screen displayed on a touch panel of the user terminal of FIG. 8.
Figure 24:
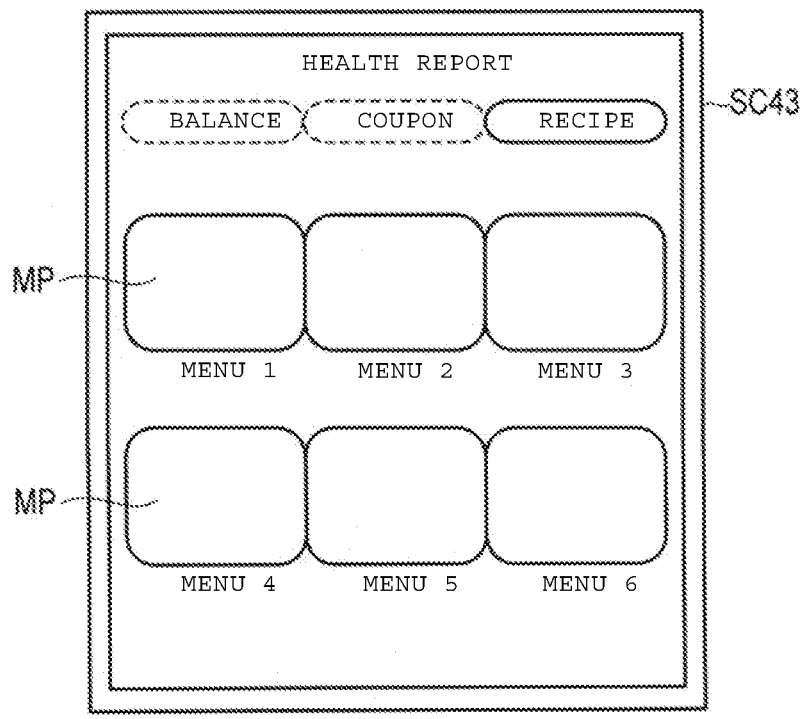
FIG. 24 is a schematic diagram illustrating an example of a recipe screen displayed on a touch panel of the user terminal of FIG. 8.
Figures 25, 26:
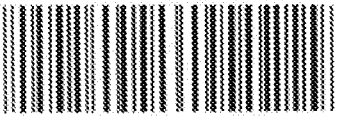
FIG. 25 is a schematic diagram illustrating an example of a recipe information screen displayed on a touch panel of the user terminal of FIG. 8.
FIG. 26 is a schematic diagram illustrating an example of a receipt with a recipe ID.

FIG. 22 to FIG. 24 are examples of the health report screen SC4. The health report screen SC4 includes a balance screen SC41 illustrated in FIG. 22, a coupon screen SC42 illustrated in FIG. 23, and a recipe screen SC43 illustrated in FIG. 24. The screens SC41, SC42, and SC43 are switched by a swipe operation. For example, in FIG. 22, by performing a left swipe operation on the balance screen SC41, the health report screen SC4 is switched to the coupon screen SC42 in FIG. 23. When a right swipe operation is performed on the coupon screen SC42, the health report screen SC4 returns to the balance screen SC41 in FIG. 21, and when a left swipe operation is performed on the coupon screen SC42, the health report screen SC4 is switched to the recipe screen SC43 in FIG. 24. In addition, when a left swipe operation of the recipe screen SC43 is performed, the health report screen SC4 returns to the coupon screen SC42 in FIG. 23.

The balance screen SC41 displays a chart C1 denoting the evaluation value E % and cost data D2 regarding the amount of money. In the chart C1, the left end is defined as E=0% and the right end is defined as E=100%. A target graphic G moves in a lateral direction from left to right and stops at a point indicating the current evaluation value E %.

Thus, the processor 131 functions as a notification unit which notifies the shopper of the evaluation value E % by processing of Act67.

The cost data D2 is represented as a fraction, with the total due in the denominator and the coupon discount amount in the numerator. The total due is the value in the work area A described above, and the discount amount is the value in the work area B.

The coupon screen SC42 displays an image CP of one or more coupon information records 35R registered in the coupon list 43 in which the application flag is not applied.

The recipe screen SC43 displays an image MP of one or more recipe information record(s) 36R registered in the recipe list 44. The image MP may be an image of the dish made by following the recipe, and functions as an icon for displaying the recipe.

That is, in Act42 in FIG. 14, the processor 201 confirms whether the image MP of the recipe screen SC43 is selected (Act43). When the image MP is not selected (NO in Act43), the processor 201 confirms whether the barcode is read by the camera 205 (Act44). When the barcode is not read (NO in Act44), the processor 201 confirms again whether the image MP of the recipe screen SC43 is selected (Act43). Thus, the processor 201 waits for selecting of the image MP and reading of the barcode by repeatedly processing Act43 and Act44.

While waiting at Act43 and Act44, when the barcode is read (YES in Act44), the processor 201 returns to Act10.

When selecting of the image MP is detected by the touch panel 204 (YES in Act43), the processor 201 controls the wireless unit 206 to transmit a recipe request to the support server 13 (Act45). The recipe request includes a recipe ID of the recipe information record 36R including the selected image MP, and a member ID. The recipe request is received by the repeater 16, and transmitted to the support server 13 through the LAN 17.

When the processor 131 receives the recipe request, the processor 131 generates image data of a recipe information screen based on information such as a recipe name, an image, recipe instructions, a material merchandise ID, or an amount from the recipe information record 36R corresponding to the recipe ID included in the recipe request. In addition, the processor 131 controls the communication interface 134 such that the image data is transmitted through the LAN 17 to the user terminal 20 that sent the recipe request. The image data is transmitted from the repeater 16, and is received by the wireless unit 206 in the user terminal 20 that sent the recipe request.

The processor 201 of the user terminal 20 that transmitted the recipe request command waits for the image data. When the image data of the recipe information screen is received through the wireless unit 206, the processor 201 displays a recipe information screen SC5 on the touch panel 204 (Act46).

FIG. 25 is an example of the recipe information screen SC5. As illustrated in FIG. 25, the recipe information screen SC5 displays information such as the image MP selected from the recipe screen SC43, a name (recipe name) of a recipe displayed on the image MP, a food item, an amount, or recipe instructions. In addition, the recipe information screen SC5 displays a storage icon IC6. The storage icon IC6 allows the shopper to store the recipe.

The processor 201 confirms whether the storage icon IC6 is touched (Act47). When the storage icon IC6 is not touched (NO in Act47), the processor 201 confirms whether the barcode is read by the camera 205 (Act48). When the barcode is not read (NO in Act48), the processor 201 confirms again whether the storage icon IC6 is touched (Act47). Thus, the processor 201 waits for touching of the storage icon IC6 and reading of the barcode by repeatedly processing Act47 and Act48.

When a barcode is read (YES in Act48), the processor 201 returns to Act10.

When touching of the storage icon IC6 is sensed by the touch panel 204 (YES in Act47), the processor 201 controls the wireless unit 206 such that the image data of the recipe information screen SC5 is stored in the auxiliary memory device 203 and a storage request, including the recipe ID of the recipe information record 36R displayed on the screen SC5 and one or more merchandise ID's, is transmitted to the repeater 16, and then to the support server 13 (Act49) through the LAN 17.

When the processor 131 of the support server 13 receives the storage request, the processor 131 searches for the recipe list 44 of the transaction file 40 which matches the merchandise ID included in the storage request. Then, the processor 131 adds a storage flag to the recipe information record 36R matching the recipe ID included in the storage request. The storage flag may be one bit for identifying whether the shopper has selected to store the recipe.

The processor 201 of the user terminal 20 that sent the storage request returns to Act42. That is, the processor 201 returns the screen of the touch panel 204 to the health report screen SC4.

In this way, the health report generated at Act97 in FIG. 17 includes the data relating to the chart C1, the cost data D2, a screen CP of the coupon information record 35R, and the image MP of the recipe information record 36R.

Using the shopping support system 100 described herein, the shopper can see to what extent selected food items conform to the health evaluation criterion set by the shopper, and increase purchases of conforming goods. The system 100 also encourages more healthy shopping by offering coupons for merchandise corresponding to the shopper's health evaluation criterion, saving the shopper money in the process. The shopper knows how much money is saved by using coupons from the cost data D2. The shopper can also identify recipes that can be made using the merchandise selected for purchase. By providing the shopper with related merchandise, coupon, nutrition, and recipe information, the shopper is encouraged to make healthy shopping choices.

The user terminal 20 displays recipe information on the recipe screen SC43 when the image MP of the recipe dish is selected. The recipe information screen SC6 is displayed on the recipe screen SC43. From there, the information of the recipe information screen SC6 can be stored in the auxiliary memory device 203 by selecting the storage icon IC6 of the recipe information screen SC6. Also, the information of the stored recipe information screen SC6 can be printed from the information terminal 15 in the store, enabling the shopper to take selected recipes out of the store when they leave. Hereinafter, an operation of printing the recipe information will be described.

When the shopper finishes shopping, the shopper scans the barcode (POS ID) which displayed on the POS terminal 14 using the camera 205 to pay for the purchased merchandise. The processor 201 of the user terminal 20 recognizes the barcode which is read in Act16 in FIG. 12. The processor 201 controls the wireless unit 206 such that the merchandise ID's and the barcode data are transmitted to the support server 13.

When the processor 131 of the support server 13 recognizes that the barcode data received from the user terminal 20 in Act66 in FIG. 16 is the POS ID (YES in Act66), the processor 131 controls the communication interface 134 such that data of the transaction file 40 which is transmitted to the POS terminal 14 which is specified by the POS ID (Act68) through the LAN 17.

When the processor 141 of the POS terminal 14 receives the transaction file addressed to a POS ID matching the POS ID stored in the auxiliary memory device 143, the processor 141 starts performing the process illustrated in the flowchart in FIG. 18.

The processor 141 first displays the merchandise list 42 of the transaction file 40 on the display device (Act101). Then, the processor 141 waits for input of payment data (Act102). When the payment data is input through an input device such as a keyboard (YES in Act102), the processor 141 performs payment processing (Act103).

The processor 141 searches for a recipe list in the transaction file 40, and confirms whether a recipe information record 36R is included that has a storage flag set (Act104). If no such recipe information is included (NO in Act104), the processor 141 causes issuance of a normal receipt (Act105). When a recipe information record 36R having a storage flag is included (YES in Act104), the processor 141 controls issue of a barcode receipt representing the recipe ID of the recipe information record 36R (Act106).

When the processing of Act105 or Act106 ends, the processor 141 controls the communication interface 144 such that purchase history update data including the member information 41 and the merchandise list 42 of the transaction file 40 is transmitted to the member server 12 (Act107) through the LAN 17.

The purchase history update data is received by the member server 12. The member server 12 adds the received purchase history update data to the purchase history database 34.

Meanwhile, the processor 141 controls the communication interface 144 such that an end command is transmitted to the support server 13 (Act108) through the LAN 17.

The processor 131 of the support server 13 waits for the end command (Act69). When the end command is received from the POS terminal 14 through the communication interface 134 (YES in Act69), the processor 131 controls the communication interface 134 such that the end command is transmitted through the LAN 17 to the user terminal 20 that matches the barcode read by the POS terminal 14 (Act70). The end command is wirelessly transmitted from the repeater 16, and is received by the wireless unit 206 in the user terminal 20.

When the processor 201 of the user terminal 20 receives the end command (YES in Act13), the processor 201 removes the registration screen (Act17).

FIG. 26 is an example of a receipt RC1 with the recipe ID which is issued by the POS terminal 14. As illustrated in FIG. 26, a barcode MB indicating the recipe ID is printed in the receipt RC1. The shopper reads the barcode MB of the receipt RC1, using a scanner of the information terminal 15. Thus, the information terminal 15 acquires the recipe information record 36R which is specified by recipe ID that is obtained based on the barcode MB, from the support server 13, and prints the acquired recipe information record. The printing may be performed by a printer included in the information terminal 15, and may be performed by a complex machine or the like which is electrically connected to the information terminal 15.

Second Embodiment

Next, a second embodiment will be described. The same symbols or reference numerals will be attached to the same units as in the first embodiment and detailed description thereof will be omitted.

Figure 27:
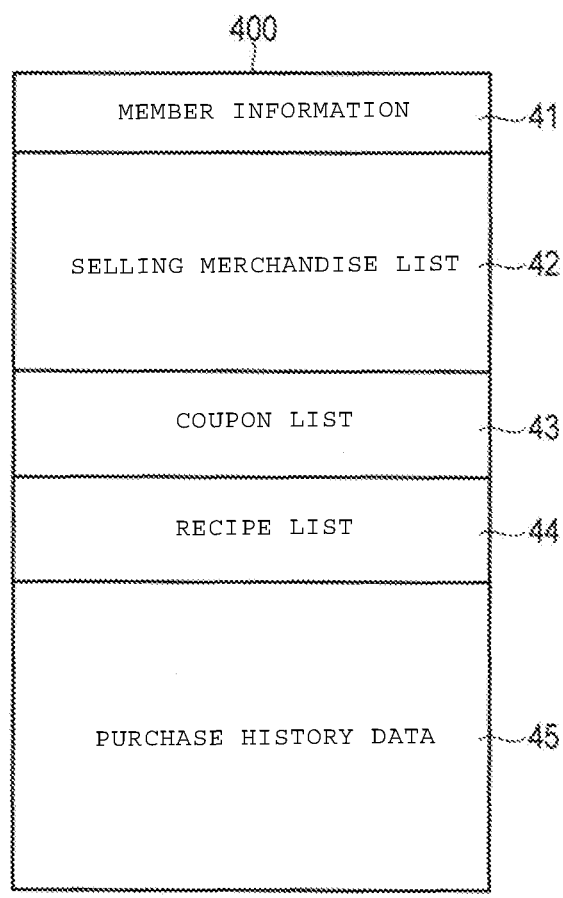
FIG. 27 is a schematic diagram illustrating a data structure of a transaction file according to a second embodiment.

FIG. 27 is a schematic diagram illustrating a data structure of a transaction file 400 according to the second embodiment. As illustrated in FIG. 27, the transaction file 400 includes the member information 41, the merchandise list 42, the coupon list 43, the recipe list 44, and purchase history data 45. The purchase history data 45 is a prior merchandise list of the member, corresponding to the member information 41, from the purchase history record 34R stored in the purchase history database 34. The number of days of available purchase history data 45 may be fixed as, for example, seven days. Alternatively, the number of days may be selected by the shopper, for example at the same time the shopper selects a health evaluation criterion.

The processor 131 of the support server 13 controls the communication interface 134 such that the purchase history data for the predetermined time period is requested from the member server 12 through the LAN 17, after the member information 41 is stored in the transaction file 400 in the processing of Act53 in FIG. 15. The purchase history data includes the member ID included in the registration start request.

The request for purchase history data is received by the member server 12. Then, the member server 12 accesses the purchase history database 34, and reads all the purchase history records 34R from the predetermined time period that match the merchandise ID(s) included in the request. Then, the member server 12 transmits the purchase history records 34R to the support server 13 that requested the history data.

When the purchase history record 34R is received through the communication interface 134, the processor 131 stores the merchandise list included in the purchase history record 34R in the transaction file 40 as the purchase history data 45. By the aforementioned processing, personal data, evaluation criteria, an item number n, the member information 41 such as the item IDs of the item number n, and the merchandise list of the predetermined historical time period are stored in the transaction file 40.

Thus, the processor 131 functions as an acquisition unit to acquires the purchase history data of the shopper.

An evaluation value E % can be calculated using the purchase history data 45 stored in the transaction file 400. That is, after the work areas A, B, C, and D are initialized to "0" in Act82 in FIG. 17, the processor 131 of the support server 13 performs Act88, Act89, and Act90 in FIG. 17, using the purchase history data 45. Thus, a total weight of the merchandise included in the purchase history data 45 is stored in the work area C. A total weight of the merchandise from the purchase history data 45 matching the evaluation criterion is stored in the work area D.

Hence, the evaluation value E which is obtained in Act91 in FIG. 17 reflects a weight value C which is the sum of the total weight of current merchandise and total weight of past merchandise and a weight value D which is the total weight of current and past merchandise upon which a health evaluation was performed.

As a result, in the second embodiment, it is possible to support the shopper such that healthy shopping with a good nutrition balance can be done also by taking purchase history into account.

The disclosure is not limited to the embodiments.

In other embodiments, the evaluation value E may be obtained based aspects other than the weight of the merchandise. For example, the evaluation value E may be obtained based on the number of units of the entire merchandise to be purchased and the number of units of merchandise upon which health evaluation was performed. In addition, the evaluation value E can also be obtained based on the amount of money of the entire merchandise to be purchased and the amount of money associated with merchandise upon which health evaluation was performed.

In other embodiments, in addition to, or instead of, displaying the evaluation value E at the user terminal 20 in a form of the chart C, the evaluation value E may be related by sound using a speaker function of the user terminal 20.

Transfer of a device such as the support server 13 is generally performed in a state where a program of the support server program P2 is stored in a ROM. However, the disclosure is not limited to this, and a program which is separately transferred from the computer device may be written to a writable memory device included in the computer device according to an operation of a user or the like. Transfer of the program can be recorded in a removable record medium, or can be performed by communication through a network. The record medium may use any type of devices, when a device can store a program such as a CD-ROM or a memory card, and can be read. In addition, a function which is obtained by installation or download of a program may be achieved in cooperation with an operating system (OS) in the device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A shopping support server comprising:
a communication interface;
a storage unit; and
a processor configured to:
control the storage unit to store a plurality of member IDs and one or more health criteria in association with each member ID,
control the communication interface to receive, from a user terminal, a merchandise ID and a member ID,
generate a merchandise list including one or more merchandise items corresponding to the one or more received merchandise IDs, determine whether each merchandise item included in the merchandise list corresponds to the one or more health criteria stored in association with the received member ID, calculate a ratio between the merchandise items included in the merchandise list and the merchandise items determined to correspond to the one or more health criteria stored in association with the received member ID, and control the communication interface to transmit the ratio to the user terminal.

2. The server according to claim 1, wherein the processor is further configured to:

control the communication interface to transmit, to the user terminal, a coupon with respect to the merchandise determined to correspond to the one or more health criteria stored in association with the received member ID, when the ratio is less than a threshold.

3. The server according to claim 2, wherein the processor flags a coupon when the coupon is applied to a transaction and checks the flag before applying the coupon to the transaction.

4. The server according to claim 3, wherein the processor calculates a total discount from applying coupons.

5. The server according to claim 4, wherein the processor controls the communication interface to transmit the total discount to the user terminal.

6. The server according to claim 1, wherein the processor is further configured to:

identify recipes in which at least one merchandise item included in the merchandise list is an ingredient, and control the communication interface to transmit, to the user terminal, a coupon for ingredients of the identified recipes that are not included in the merchandise list when the ratio is less than a predetermined threshold.

7. A shopping support system, comprising:

a user terminal with an input device and a display device;

a network connecting the shopping support server and the user terminal; and a shopping support server, comprising:
  a communication interface,
  a storage unit, and
  a processor configured to:
    control the storage unit to store a plurality of member IDs and one or more health criteria in association with each member ID,
    control the communication interface to receive, from the user terminal, a merchandise ID and a member ID,
    generate a merchandise list including one or more merchandise items corresponding to the one or more received merchandise IDs,
    determine whether each merchandise item included in the merchandise list corresponds to the one or more health criteria stored in association with the received member ID,
    calculate a ratio between the merchandise items included in the merchandise list and the merchandise items determined to correspond to the one or more health criteria stored in association with the received member ID, and
    control the communication interface to transmit the ratio to the user terminal.

8. The shopping support system of claim 7, wherein the user terminal further comprises a wireless communication device.

9. The shopping support system of claim 8, wherein the user terminal is mobile.

10. The shopping support system of claim 7, wherein the shopping support server is further configured to control the communication interface to transmit, to the user terminal, a coupon with respect to the merchandise determined to correspond to the one or more health criteria stored in association with the received member ID, when the ratio is less than a threshold.

11. The shopping support system of claim 10, wherein the shopping support server is further configured to identify recipes in which at least one merchandise item included in the merchandise list is an ingredient.

12. The shopping support system of claim 11, wherein the shopping support server is further configured to transmit, to the user terminal, a coupon for ingredients of the identified recipes that are not included in the merchandise list when the ratio is less than a predetermined threshold.

13. The shopping support system of claim 7, further comprising a POS terminal and an information terminal.

14. The shopping support system of claim 13, wherein the shopping support server is further configured to:

control the communication interface to transmit, to the user terminal, a coupon with respect to the merchandise determined to correspond to the one or more health criteria stored in association with the received member ID, when the ratio is less than a threshold, identify recipes in which at least one merchandise item included in the merchandise list is an ingredient, and mark recipes for later printing by the information terminal.

15. A shopping support program that causes a computer, connected through a network to a user terminal including an input device for identifying merchandise and a display device, to perform functions of:

storing a plurality of member IDs and one or more health criteria in association with each member ID, receiving, from a user terminal, a merchandise ID and a member ID, generating a merchandise list including one or more merchandise items, corresponding to one or more received merchandise IDs, a shopper plans to purchase based on the information acquired using the input device;

determining whether or not each merchandise item included in the merchandise list corresponds to the one or more health criteria stored in a association with the received member ID;

calculating a ratio of merchandise items included in the merchandise list to the merchandise items determined to correspond to the one or more health criteria stored in association with the received member ID; and transmitting image information for displaying an image which illustrates the ratio to the display device.

* * * * *